(12) United States Patent
Cheraghi et al.

(10) Patent No.: US 11,374,625 B2
(45) Date of Patent: Jun. 28, 2022

(54) DEVICES AND METHODS FOR FACILITATING BEAMFORMING COMMUNICATIONS IN WIRELESS DEVICES

(71) Applicant: QUALCOMM Incorporated, San Diego, CA (US)

(72) Inventors: Parisa Cheraghi, San Diego, CA (US); Ahmed Elshafie, San Diego, CA (US); Alexei Yurievitch Gorokhov, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 274 days.

(21) Appl. No.: 16/575,313

(22) Filed: Sep. 18, 2019

(65) Prior Publication Data

US 2021/0083728 A1    Mar. 18, 2021

(51) Int. Cl.
*H04B 7/0408*    (2017.01)
*H04B 7/0456*    (2017.01)
*H04B 7/06*    (2006.01)
*H04B 7/08*    (2006.01)

(52) U.S. Cl.
CPC ......... *H04B 7/0408* (2013.01); *H04B 7/0456* (2013.01); *H04B 7/0617* (2013.01); *H04B 7/0854* (2013.01)

(58) Field of Classification Search
CPC .. H04B 7/0408; H04B 7/0456; H04B 7/0617; H04B 7/0854
See application file for complete search history.

(56) References Cited

U.S. PATENT DOCUMENTS

| 2011/0064156 A1 | 3/2011 | Kim et al. |
| 2011/0249637 A1 | 10/2011 | Hammarwall et al. |
| 2014/0376600 A1 | 12/2014 | Kosakowski et al. |

(Continued)

OTHER PUBLICATIONS

Huawei, et al., "General Views on DL Beam Management", 3GPP Draft, 3GPP TSG RAN WG1 NR Ad Hoc Meeting, R1-1711636, 3rd Generation Partnership Project (3GPP), Mobile Competence Centre, 650, Route Des Lucioles, F-06921 Sophia-Antipolis Cedex, France, vol. RAN WG1, No. Qingdao, China, Jun. 27, 2017-Jun. 30, 2017, Jun. 26, 2017 (Jun. 26, 2017), XP051300798, 12 Pages, Retrieved from the Internet: URL: http://www.3gpp.org/ftp/Meetings_3GPP_SYNC/RAN1/Docs/, [retrieved on Jun. 26, 2017], the whole document.

(Continued)

*Primary Examiner* — Natasha W Cosme
(74) *Attorney, Agent, or Firm* — QUALCOMM Incorporated

(57) ABSTRACT

Wireless devices are adapted to facilitate beamforming communications in wireless networks. A wireless device may identify a first beam group with a number of beams equal to a maximum number of allowed beams, and a second beam group with a number of beams less than the maximum number of allowed beams. Channel statistics may be estimated for each of the first beam group and the second beam group, and the second beam group may be selected for communications when the second beam group is determined to have at least substantially equal or greater channel statistics compared to the first beam group. Other aspects, embodiments, and features are also included.

40 Claims, 10 Drawing Sheets

(56) References Cited

U.S. PATENT DOCUMENTS

2018/0034519 A1 2/2018 Rahman et al.
2018/0083676 A1 3/2018 Wei et al.
2018/0368149 A1* 12/2018 Raghavan ......... H04W 72/1231
2020/0186207 A1* 6/2020 Davydov ............. H04B 7/0417

OTHER PUBLICATIONS

International Search Report and Written Opinion—PCT/US2019/052566—ISAEPO—dated Jun. 2, 2020.
ZTE, et al.,"Type II CSI Feedback based on Linear Combination", 3GPP Draft, 3GPP TSG RAN WG1 Meeting #88bis, R1-1704408 Type II CSI Feedback based on Linear Combination, 3rd Generation Partnership Project (3GPP), Mobile Competence Centre, 650, Route Des Lucioles, F-06921 Sophia-Antipolis Cedex, vol. RAN WG1, No. Spokane, USA, Apr. 3, 2017-Apr. 7, 2017, Apr. 2, 2017 (Apr. 2, 2017), XP051242555, 13 Pages, Retrieved from the Internet: URL: http://www.3gpp.org/ftp/Meetings_3GPP_SYNC/RAN1/Docs/, [retrieved on Apr. 2, 2017], the whole document, Section 2.
ZTE Microelectronics: "Group Based Beam Management", 3GPP Draft, 3GPP TSG RAN WG1 Meeting #87, R1-1611415 Group Based Beam Management, 3rd Generation Partnership Project (3GPP), Mobile Competence Centre, 650, Route Des Lucioles, F-06921 Sophia-Antipolis Cedex, France, vol. RAN WG1, No. Reno, USA, Nov. 14, 2016-Nov. 18, 2016, Nov. 13, 2016 (Nov. 13, 2016), XP051175395, 7 Pages, Retrieved from the Internet: URL http://www.3gpp.org/ftp/Meetings_3GPP_SYNC/RAN1/Docs/, [retrieved on Nov. 13, 2016], the whole document.

* cited by examiner

DEVICES AND METHODS FOR FACILITATING BEAMFORMING COMMUNICATIONS IN WIRELESS DEVICES

TECHNICAL FIELD

The technology discussed below relates generally to wireless communication systems, and more particularly, to facilitating beamformed communications between wireless communication devices. Disclosed techniques, according to some embodiments, can enable and provide channel state feedback via improved beam forming and precoder selection.

INTRODUCTION

Wireless communications systems are widely deployed to provide various types of communication content such as voice, video, packet data, messaging, broadcast, and so on. These systems may be accessed by various types of devices adapted to facilitate wireless communications, where multiple devices share the available system resources (e.g., time, frequency, and power).

As the demand for mobile broadband access continues to increase, research and development continue to advance wireless communication technologies not only to meet the growing demand for mobile broadband access, but to advance and enhance the user experience with mobile communications. For example, the third generation partnership project (3GPP) is an organization that develops and maintains telecommunication standards for fourth generation (4G) long-term evolution (LTE) networks. Recently, the 3GPP has begun the development of a next-generation evolution of LTE called New Radio (NR), which may correspond to a fifth generation (5G) network. As it stands today, 5G NR networks may exhibit a higher degree of flexibility and scalability than LTE, and are envisioned to support very diverse sets of requirements. Techniques applicable in such networks for reducing computation complexity in devices as well as reducing size of transmissions may be desirable.

BRIEF SUMMARY OF SOME EXAMPLES

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

Various examples and implementations of the present disclosure facilitate channel state feedback via improved beam forming and precoder selection for wireless communications systems. In at least one aspect of the present disclosure, apparatus for wireless communications are provided. In at least one example, an apparatus for wireless communications may include a transceiver, a memory, and a processing circuit coupled to the transceiver and the memory. The processing circuit may be configured to identify a first beam group with a number of beams equal to a maximum number of allowed beams, and a second beam group with a number of beams less than the maximum number of allowed beams. The processing circuit may further be configured to estimate channel statistics for each of the first beam group and the second beam group, and select the second beam group for wireless communications when the second beam group exhibits channel statistics that are at least substantially equal or greater than channel statistics for the first beam group.

In at least one example, an apparatus for wireless communications may include a transceiver, a memory, and a processing circuit coupled to the transceiver and the memory. The processing circuit may be configured to receive a first message on a wireless network via the transceiver. The first message may indicate a precoder for utilization in sending beamformed transmissions, where the precoder designates a number of beams less than a maximum number of beams permitted by the wireless network. The processing circuit may further be configured to precode a second message with the indicated precoder, and send via the transceiver a beamformed transmission including the precoded second message on the beams designated the indicated precoder.

In at least one example, an apparatus for wireless communications may include a transceiver, a storage medium including at least one precoder codebook, and a processing circuit coupled to the transceiver and the storage medium. The processing circuit may be configured to select a precoder from the at least one precoder codebook utilizing reduced computation complexity, where the reduction in computation complexity is a result of selecting a number of beams to be utilized for receiving beamformed transmissions that are less than a maximum number of permitted beams for combination in receiving beamformed transmissions. The selected number of beams may be derived based on estimated channel conditions indicating the selected number of beams provides at least substantially equal or higher channel statistics compared to the maximum number of permitted beams. The processing circuit may further be configured to transmit a report message via the transceiver, where the report message indicates the selected precoder.

In at least one example, an apparatus for wireless communications may include a transceiver, a memory, and a processing circuit coupled to the transceiver and the memory. The processing circuit may be configured to estimate channel statistics for a first beam combination including a number of combined beams equal to a maximum allowed number of combined beams, and for a second beam combination including a number of combined beams less than the maximum allowed number of combined beams. The processing circuit may further be configured to select the second beam combination for communications with a network when the estimated channel statistics for the second beam combination are equal to or higher than the estimated channel statistics for the first beam combination.

In at least one example, an apparatus for wireless communications may include a transceiver, a memory, and a processing circuit coupled to the transceiver and the memory. The processing circuit may be configured to generate a report message indicating estimated channel statistics for a plurality of digital beams, where the report message indicates an amplitude of zero for at least one digital beam that was estimated to have a non-zero amplitude. The processing circuit may further be configured to transmit the report message via the transceiver.

In at least one example, an apparatus for wireless communications may include an antenna array, a receive chain, a processing circuit, and a transmit chain. The antenna array may be sized and shaped for millimeter wave (mmWave)

beam-based communications, and may include a plurality of spaced-apart antenna elements. The receive chain may be configured to receive one or more wireless signals, via the antenna array, including a plurality of communication beams from another wireless communication device. The processing circuit may be configured to determine a first beam group from the plurality of communication beams, the first beam group including a number of beams lower than a number of allowed beams based on channel conditions. The transmit chain may be configured to transmit one or more wireless signals, via the antenna array, employing beams of the first beam group.

Further aspects provide methods operational on apparatus for wireless communication and/or apparatus for wireless communication including means to perform such methods. One or more examples of such methods may include identifying a first beam group with a number of beams equal to a maximum number of allowed beams, and a second beam group with a number of beams less than the maximum number of allowed beams. Channel statistics may be estimated for each of the first beam group and the second beam group, and the second beam group may be selected for wireless communications when the second beam group exhibits channel statistics that are at least substantially equal or greater than channel statistics for the first beam group.

One or more further examples of such methods may include receiving a first message on a wireless network. The message may indicate a precoder for utilization in sending beamformed transmissions, where the precoder indicates a number of beams less than a maximum number of beams permitted by the wireless network. A second message may be precoded with the indicated precoder, and a transmission including the precoded second message may be sent on the beams associated with the indicated precoder.

Still further aspects of the present disclosure include computer-readable storage mediums storing processor-executable programming. In at least one example, the processor-executable programming may be adapted to cause a processing circuit to identify a first beam group with a number of beams equal to a maximum number of allowed beams, and a second beam group with a number of beams less than the maximum number of allowed beams. The processor-executable programming may further be adapted to cause a processing circuit to estimate channel statistics for each of the first beam group and the second beam group, and select the second beam group for wireless communications when the second beam group exhibits channel statistics that are at least substantially equal or greater than channel statistics for the first beam group.

In at least one example, the processor-executable programming may be adapted to cause a processing circuit to receive a first message on a wireless network. The message may indicate a precoder for utilization in sending beamformed transmissions, where the precoder indicates a number of beams less than a maximum number of beams permitted by the wireless network. The processor-executable programming may further be adapted to cause a processing circuit to precode a second message with the indicated precoder, and send via the transceiver a beamformed transmission including the precoded second message on the beams associated with the indicated precoder.

These and other aspects of the invention will become more fully understood upon a review of the detailed description, which follows. Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form to avoid obscuring such concepts.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or OEM devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes, and constitution.

Figure 1:
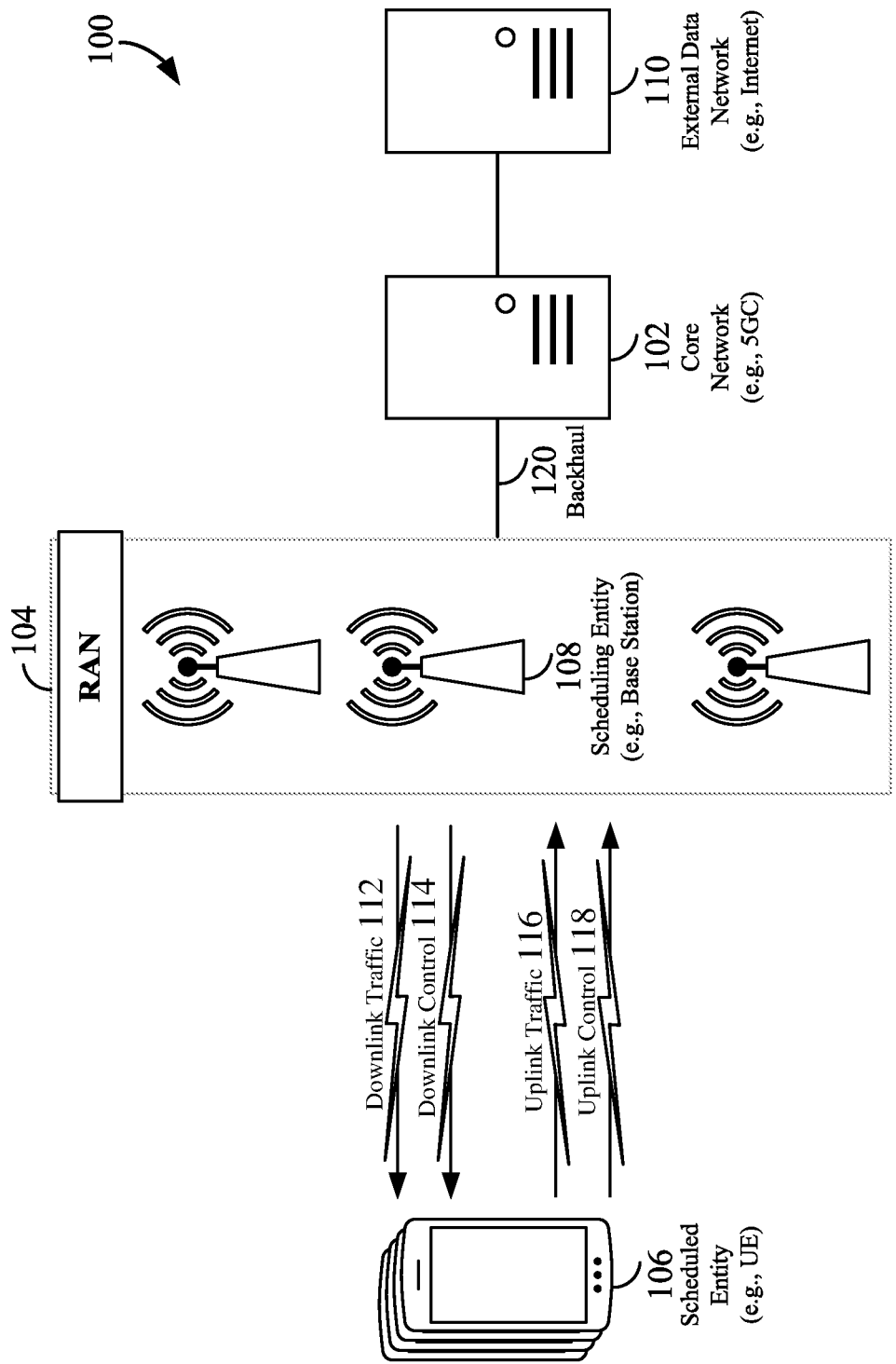
FIG. 1 is a schematic diagram illustrating an example of a wireless communication system according to one or more embodiments.

The various concepts presented throughout this disclosure may be implemented across a broad variety of telecommunication systems, network architectures, and communication standards. Referring now to FIG. 1, as an illustrative example without limitation, various aspects of the present disclosure are illustrated with reference to a wireless communication system 100. The wireless communication system 100 includes three interacting domains: a core network 102, a radio access network (RAN) 104, and a user equipment (UE) 106. By virtue of the wireless communication system 100, the UE 106 may be enabled to carry out data communication with an external data network 110, such as (but not limited to) the Internet.

The RAN 104 may implement any suitable wireless communication technology or technologies to provide radio access to the UE 106. As one example, the RAN 104 may operate according to 3$^{rd}$ Generation Partnership Project (3GPP) New Radio (NR) specifications, often referred to as 5G. As another example, the RAN 104 may operate under a hybrid of 5G NR and Evolved Universal Terrestrial Radio Access Network (eUTRAN) standards, often referred to as LTE. The 3GPP refers to this hybrid RAN as a next-generation RAN, or NG-RAN. Of course, many other examples may be utilized within the scope of the present disclosure.

As illustrated, the RAN 104 includes a plurality of base stations 108. Broadly, a base station is a network element in a radio access network responsible for radio transmission and reception in one or more cells to or from a UE. In different technologies, standards, or contexts, a base station may variously be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB), or some other suitable terminology.

The radio access network 104 is further illustrated supporting wireless communication for multiple mobile apparatuses. A mobile apparatus may be referred to as user equipment (UE) in 3GPP standards, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus that provides a user with access to network services.

Within the present document, a "mobile" apparatus need not necessarily have a capability to move, and may be stationary. The term mobile apparatus or mobile device broadly refers to a diverse array of devices and technologies. UEs may include a number of hardware structural components sized, shaped, and arranged to help in communication; such components can include antennas, antenna arrays, RF chains, amplifiers, one or more processors, etc. electrically coupled to each other. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of things" (IoT). A mobile apparatus may additionally be an automotive or other transportation vehicle, a remote sensor or actuator, a robot or robotics device, a satellite radio, a global positioning system (GPS) device, an object tracking device, a drone, a multi-copter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc., an industrial automation and enterprise device, a logistics controller, agricultural equipment, military defense equipment, vehicles, aircraft, ships, and weaponry, etc. Still further, a mobile apparatus may provide for connected medicine or telemedicine support, e.g., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Wireless communication between a RAN 104 and a UE 106 may be described as utilizing an air interface. Transmissions over the air interface from a base station (e.g., base station 108) to one or more UEs (e.g., UE 106) may be referred to as downlink (DL) transmission. In accordance with certain aspects of the present disclosure, the term downlink may refer to a point-to-multipoint transmission originating at a scheduling entity (described further below; e.g., base station 108). Another way to describe this scheme may be to use the term broadcast channel multiplexing. Transmissions from a UE (e.g., UE 106) to a base station (e.g., base station 108) may be referred to as uplink (UL) transmissions. In accordance with further aspects of the present disclosure, the term uplink may refer to a point-topoint transmission originating at a scheduled entity (described further below; e.g., UE 106).

In some examples, access to the air interface may be scheduled, wherein a scheduling entity (e.g., a base station 108) allocates resources for communication among some or all devices and equipment within its service area or cell. Within the present disclosure, as discussed further below, the scheduling entity may be responsible for scheduling, assigning, reconfiguring, and releasing resources for one or more scheduled entities. That is, for scheduled communication, UEs 106, which may be scheduled entities, may utilize resources allocated by the scheduling entity 108.

Base stations 108 are not the only entities that may function as scheduling entities. That is, in some examples, a UE may function as a scheduling entity, scheduling resources for one or more scheduled entities (e.g., one or more other UEs).

As illustrated in FIG. 1, a scheduling entity 108 may broadcast downlink traffic 112 to one or more scheduled entities 106. Broadly, the scheduling entity 108 is a node or device responsible for scheduling traffic in a wireless communication network, including the downlink traffic 112 and, in some examples, uplink traffic 116 from one or more scheduled entities 106 to the scheduling entity 108. On the other hand, the scheduled entity 106 is a node or device that receives downlink control information 114, including but not limited to scheduling information (e.g., a grant), synchronization or timing information, or other control information from another entity in the wireless communication network such as the scheduling entity 108.

In general, base stations 108 may include a backhaul interface for communication with a backhaul portion 120 of the wireless communication system. The backhaul 120 may provide a link between a base station 108 and the core network 102. Further, in some examples, a backhaul network may provide interconnection between the respective base stations 108. Various types of backhaul interfaces may be employed, such as a direct physical connection, a virtual network, or the like using any suitable transport network.

The core network 102 may be a part of the wireless communication system 100, and may be independent of the radio access technology used in the RAN 104. In some examples, the core network 102 may be configured according to 5G standards (e.g., 5GC). In other examples, the core network 102 may be configured according to a 4G evolved packet core (EPC), or any other suitable standard or configuration.

Figure 2:
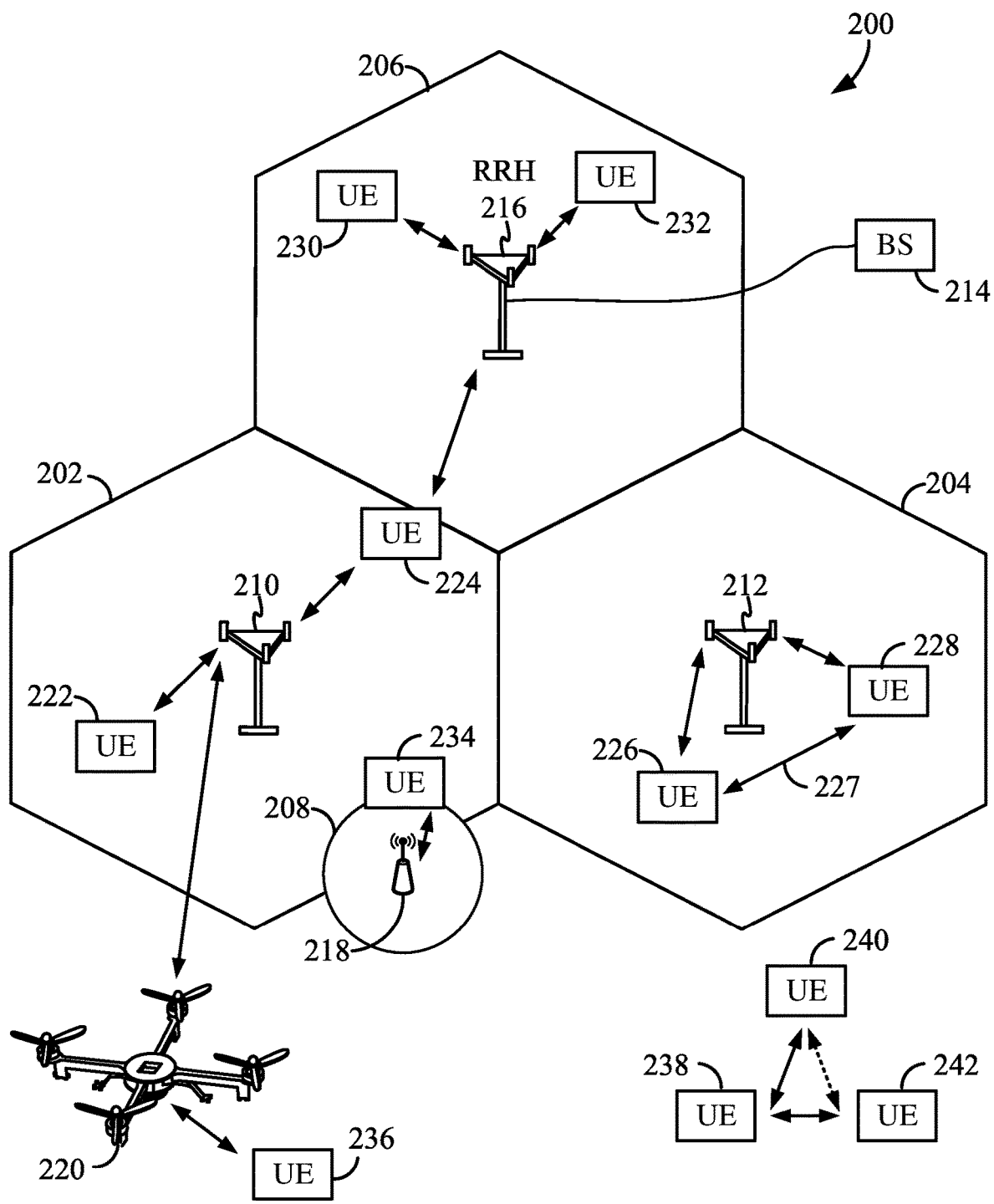
FIG. 2 is a conceptual diagram illustrating an example of a radio access network according to some embodiments.

Referring now to FIG. 2, by way of example and without limitation, a schematic illustration of a RAN 200 is provided. In some examples, the RAN 200 may be the same as the RAN 104 described above and illustrated in FIG. 1. The geographic area covered by the RAN 200 may be divided into cellular regions (cells) that can be uniquely identified by a user equipment (UE) based on an identification broadcasted from one access point or base station. FIG. 2 illustrates macrocells 202, 204, and 206, and a small cell 208, each of which may include one or more sectors (not shown). A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

In FIG. 2, two base stations 210 and 212 are shown in cells 202 and 204, and a third base station 214 is shown controlling a remote radio head (RRH) 216 in cell 206. That is, a base station can have an integrated antenna or can be connected to an antenna or RRH by feeder cables. In the illustrated example, the cells 202, 204, and 206 may be referred to as macrocells, as the base stations 210, 212, and 214 support cells having a large size. Further, a base station 218 is shown in the small cell 208 (e.g., a microcell, picocell, femtocell, home base station, home Node B, home eNode B, etc.) which may overlap with one or more macrocells. In this example, the cell 208 may be referred to as a small cell, as the base station 218 supports a cell having a relatively small size. Cell sizing can be done according to system design as well as component constraints.

It is to be understood that the radio access network 200 may include any number of wireless base stations and cells. Further, a relay node may be deployed to extend the size or coverage area of a given cell. The base stations 210, 212, 214, 218 provide wireless access points to a core network for any number of mobile apparatuses. In some examples, the base stations 210, 212, 214, and/or 218 may be the same as the base station/scheduling entity 108 described above and illustrated in FIG. 1.

FIG. 2 further includes a quadcopter or drone 220, which may be configured to function as a base station. That is, in some examples, a cell may not necessarily be stationary, and the geographic area of the cell may move according to the location of a mobile base station such as the quadcopter 220.

Within the RAN 200, the cells may include UEs that may be in communication with one or more sectors of each cell. Further, each base station 210, 212, 214, 218, and 220 may be configured to provide an access point to a core network 102 (see FIG. 1) for all the UEs in the respective cells. For example, UEs 222 and 224 may be in communication with base station 210, UEs 226 and 228 may be in communication with base station 212, UEs 230 and 232 may be in communication with base station 214 by way of RRH 216, UE 234 may be in communication with base station 218, and UE 236 may be in communication with mobile base station 220. In some examples, the UEs 222, 224, 226, 228, 230, 232, 234, 236, 238, 240, and/or 242 may be the same as the UE/scheduled entity 106 described above and illustrated in FIG. 1.

In some examples, a mobile network node (e.g., quadcopter 220) may be configured to function as a UE. For example, the quadcopter 220 may operate within cell 202 by communicating with base station 210.

In a further aspect of the RAN 200, sidelink signals may be used between UEs without necessarily relying on scheduling or control information from a base station. For example, two or more UEs (e.g., UEs 226 and 228) may communicate with each other using peer to peer (P2P) or sidelink signals 227 without relaying that communication through a base station (e.g., base station 212). In a further example, UE 238 is illustrated communicating with UEs 240 and 242. Here, the UE 238 may function as a scheduling entity or a primary sidelink device, and UEs 240 and 242 may function as a scheduled entity or a non-primary (e.g., secondary) sidelink device. In still another example, a UE may function as a scheduling entity in a device-to-device (D2D), peer-to-peer (P2P), or vehicle-to-vehicle (V2V) network, and/or in a mesh network. In a mesh network example, UEs 240 and 242 may optionally communicate directly with one another in addition to communicating with the scheduling entity 238. Thus, in a wireless communication system with scheduled access to time-frequency resources and having a cellular configuration, a P2P configuration, or a mesh configuration, a scheduling entity and one or more scheduled entities may communicate utilizing the scheduled resources.

In the radio access network 200, the ability for a UE to communicate while moving, independent of its location, is referred to as mobility. The various physical channels between the UE and the radio access network are generally set up, maintained, and released under the control of an access and mobility management function (AMF, not illustrated, part of the core network 102 in FIG. 1), which may include a security context management function (SCMF) that manages the security context for both the control plane and the user plane functionality, and a security anchor function (SEAF) that performs authentication.

Figure 3:
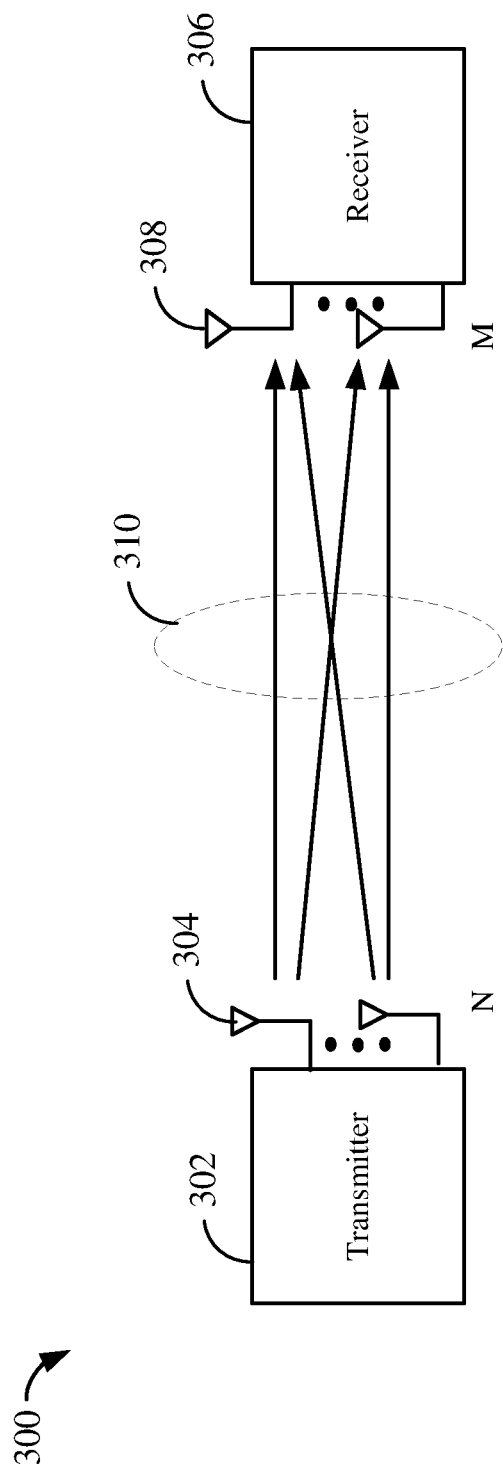
FIG. 3 is a block diagram illustrating a wireless communication system supporting multiple-input multiple-output (MIMO) communication.

In some aspects of the disclosure, the scheduling entity and/or scheduled entity may be configured for beamforming and/or multiple-input multiple-output (MIMO) technology. FIG. 3 illustrates an example of a wireless communication system 300 supporting MIMO. In a MIMO system, a transmitter 302 includes multiple transmit antennas 304 (e.g., N transmit antennas) and a receiver 306 includes multiple receive antennas 308 (e.g., M receive antennas). Thus, there are N×M signal paths 310 from the transmit antennas 304 to the receive antennas 308. Each of the transmitter 302 and the receiver 306 may be implemented, for example, within a scheduling entity 108, a scheduled entity 106, or any other suitable wireless communication device.

The use of such multiple antenna technology enables the wireless communication system to exploit the spatial domain to support spatial multiplexing, beamforming, and transmit diversity. Spatial multiplexing may be used to transmit different streams of data, also referred to as layers, simultaneously on the same time-frequency resource. The data streams may be transmitted to a single UE to increase the data rate or to multiple UEs to increase the overall system capacity, the latter being referred to as multi-user MIMO (MU-MIMO). This is achieved by spatially precoding each data stream (i.e., multiplying the data streams with different weighting and phase shifting) and then transmitting each spatially precoded stream through multiple transmit antennas on the downlink. The spatially precoded data streams arrive at the UE(s) with different spatial signatures, which enables each of the UE(s) to recover the one or more data streams destined for that UE. On the uplink, each UE transmits a spatially precoded data stream, which enables the base station to identify the source of each spatially precoded data stream.

UEs may communicate a variety of information to a base station during communications in accordance with disclosed aspects. Information may be included in one or more uplink transmissions and include data, control, and feedback. For example, in 5G NR communication scenarios with 5G NR networks, a UE may utilize type I channel state feedback (CSF) or type II CSF. These CSF types may be use for beam selection, and can identify one or more beams to use for communications with a network (e.g., beams bunched together in beam groups or beams with certain characteristics). For Type I beam forming, a UE can identify and use one beam out of several (e.g., a dominant beam). For Type II beam forming, a UE can utilize multiple beams within a set or group. Multiple beams may be utilized for providing more than one data stream or layer.

The number of data streams or layers corresponds to the rank of the transmission. In general, the rank of the MIMO system 300 is limited by the number of transmit or receive antennas 304 or 308, whichever is lower. In addition, the channel conditions at the UE, as well as other considerations, such as the available resources at the base station, may also affect the transmission rank. For example, the rank (and therefore, the number of data streams) assigned to a particular UE on the downlink may be determined based on the rank indicator (RI) transmitted from the UE to the base station. The RI may be determined based on the antenna configuration (e.g., the number of transmit and receive antennas) and a measured signal-to-interference-and-noise ratio (SINR) on each of the receive antennas. The RI may indicate, for example, the number of layers that may be supported under the current channel conditions. The base station may use the RI, along with resource information (e.g., the available resources and amount of data to be scheduled for the UE), to assign a transmission rank to the UE.

In Time Division Duplex (TDD) systems, the UL and DL are reciprocal, in that each uses different time slots of the same frequency bandwidth. Therefore, in TDD systems, the base station may assign the rank for DL MIMO transmissions based on UL SINR measurements (e.g., based on a Sounding Reference Signal (SRS) transmitted from the UE or other pilot signal). Based on the assigned rank, the base station may then transmit the CSI-RS with separate C-RS sequences for each layer to provide for multi-layer channel estimation. From the CSI-RS, the UE may measure the channel quality across layers and resource blocks and feed back the CQI and RI values to the base station for use in updating the rank and assigning REs for future downlink transmissions.

In the simplest case, as shown in FIG. 3, a rank 2 spatial multiplexing transmission on a 2×2 MIMO antenna configuration will transmit one data stream from each transmit antenna 304. Each data stream reaches each receive antenna 308 along a different signal path 310. The receiver 306 may then reconstruct the data streams using the received signals from each receive antenna 308.

With spatial multiplexing, spatially precoded streams are generated by multiplying a stream by a precoder matrix. The precoder matrix is typically selected from a codebook of possible precoder matrices, and is typically indicated by means of a precoder matrix indicator (PMI). For Type II CSF rank 1 and rank 2, the PMI codebook, which may also be referred to as a Type II codebook, assumes the following precoder structure:

$$W = \begin{bmatrix} \tilde{w}_{0,0} \\ \tilde{w}_{1,0} \end{bmatrix} = W_1 W_2, \text{ where } W \text{ is normalized to } 1. \quad \text{Rank 1}$$

$$W = \begin{bmatrix} \tilde{w}_{0,0} & \tilde{w}_{0,1} \\ \tilde{w}_{1,0} & \tilde{w}_{1,1} \end{bmatrix} = W_1 W_2, \quad \text{Rank 2}$$

$$\text{where columns of } W \text{ are normazlied to } \frac{1}{\sqrt{2}}.$$

Given $\tilde{w}_{r,l} = \sum_{i=0}^{L-1} b_{k_1^{(i)} k_2^{(i)}} \cdot p_{r,l,i}^{(WB)} \cdot p_{r,l,i}^{(SB)} \cdot c_{r,l,i}$, Where $b_{k_1,k_2}$ is an oversampled two-dimensional discrete Fourier transform (DFT) beam, r=0, 1 (polarization), l=0, 1 (layer), $p_{r,l,i}^{(WB)}$ is a wideband (WB) beam amplitude scaling factor (3 bits), $p_{r,l,i}^{(SB)}$ is a subband (SB) beam amplitude scaling factor (1 bit), and $c_{r,l,i}$ is a beam combining coefficient (2 or 3 bits configurable).

As suggested above, Type II CSF utilizing the Type II codebook enables the value L, representing the number of beams, to be configurable to be greater than 1. For example, with Type II CSF, a UE may typically use 2 or more beams as may be designated by the network. In some implementations, the value of L may be 2, 3, or 4. The higher number of beams, the more granular the feedback for the UE. However, the more beams that are used for communications with the UE, the more complicated it is for the UE to determine the optimal precoder based on the allowed codebook. Due to the size of the codebook for this feedback, it is relatively challenging from a power/cycle/complexity point of view to determine the precoder. This complexity of finding the correct precoder from the codebook increases exponentially with the number of beams. Additionally, the higher the number of beams, the more feedback is transmitted by the UE to the network.

According to one or more aspects of the present disclosure, wireless devices may select a group of beams for communication purposes. Beam group selections can be based on a variety of factors, and beam groups may contain one or more beams as desired. Beam numbers may be equal to, higher, or lower than a particular threshold or beam number (e.g., a beam number designated by a network or according to desired operations). In one example, a selected beam group may include a number of beams 'L' that is less than a number of beams '$L_{MAX}$' permitted by a network. That is, for example, a group of beams may be chosen based on the beam group having a number of beams lower than a maximum number of beams for a particular network.

Figure 4:
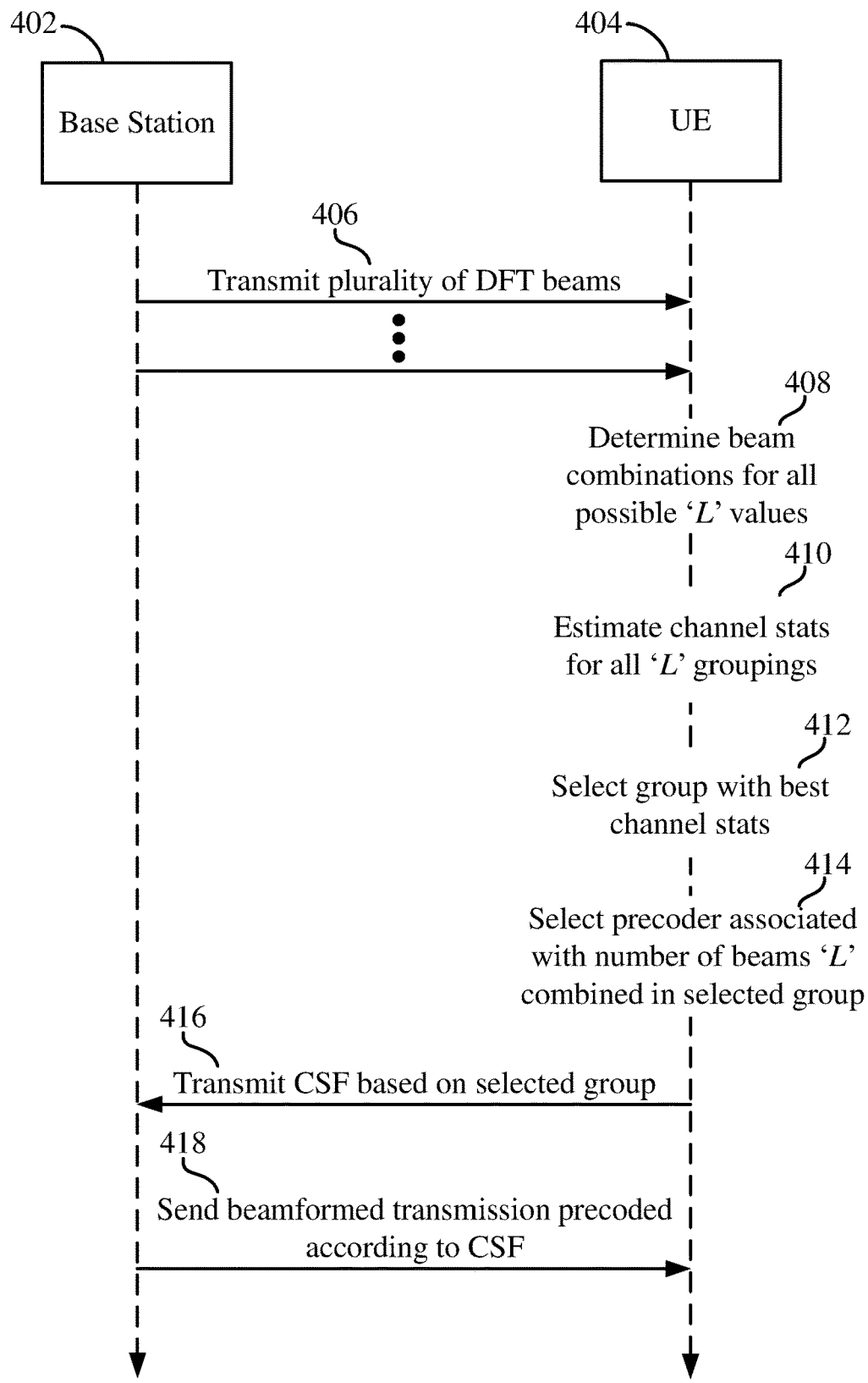
FIG. 4 is a flow diagram depicting an example of a receiver selecting a beam combination (e.g., with a number of beams 'L' less than a maximum number of beams permitted by a network) according to some embodiments.

Turning now to FIG. 4, a flow diagram is shown depicting an example of a receiver selecting beams. In this illustrated example, a receiver can select a beam combination with a number of beams that is less than a maximum number of beams '$L_{MAX}$' permitted, or designated, by a network. For simplicity, a base station 402 is depicted as the transmitter (e.g., transmitter 302 in FIG. 3) and a UE 404 is depicted as the receiver (e.g., receiver 306 in FIG. 3). As shown, the base station 402 transmits a reference signal (e.g., CSI RS) associated with a plurality of DFT beams 406 to the UE 404. Depending on the antenna configuration utilized, the number of DFT beams transmitted by the base station 402 may be as few as 4 beams and as many as 256 beams.

The UE 404 can determine beam combinations 408 for a variety of possible 'L' values. In some embodiments, determinations may be for all possible 'L' values or only a portion of all possible 'L' values. For example, the maximum number of beams permitted to be combined by the network may be four (e.g., '$L_{MAX}$'=4). The UE 404 may accordingly determine a plurality of beam combinations 408. Beam combinations may be arranged in logical groups. As one example, these logical groups can include one or more groups of 2 beams, one or more groups of 3 beams, and one or more groups of 4 beams. Generally speaking, a UE can determine beam combinations as a function of or based on groups of beams. Beam groups and beam numbers may be limited by network parameters or other desired operational characteristics. According to one example, the UE 404 can determine beam combinations for groups of 2 beams up to the maximum number of beams permitted by the network to be grouped for combination.

Determinations regarding grouping individual beams into one or more beam groups may be based on a number of factors. These factors can include desired group sizes and/or inputs according to or based on a codebook. A codebook may contain predetermined beam settings given a set of criteria or operational parameters. As one example, for each group of beam combinations, a UE 404 may utilize a codebook to determine which beams are permitted to be combined. For example, the codebook may specify that beam combinations include beams that are a predefined number of indexes apart from each other (e.g., 2, 4, etc. indexes apart).

In addition to selecting beams for beam combination, statistical evaluations may also be of interest according to some aspects. For example, according to one implementation, wireless devices may evaluate beams on any number of numerical attributes, such as averages and estimates. Averages may be calculated per beam combination group. In one particular example, a UE 404 may estimate 410 channel statistics for each of the plurality of beam combination groups, and may determine a value associated with the channel statistics for each beam group. By way of example and not limitation, such channel statistics may include channel correlation, covariance, cross correlation, and/or other channel state information. In estimating the channel statistics for each group, the UE 404 may calculate an average value for each group, such as by simply calculating a mathematical mean determined by adding an estimated channel statistics value for each beam in the group, and then dividing the sum by the total number of beams in the group.

As an illustrative example, the UE 404 may estimate a first group (group A) having 4 combined beams to exhibit a first group value A, two groups (group B and group C) each having 3 combined beams to exhibit group values of B and C, and four groups (group D, group E, group F, and group G) each having 2 combined beams to exhibit group values of D, E, F, and G. As noted above, the group values may be determined by calculating the average, or mean, channel statistics value all the beam in a group. In one example, the values may be such that the group values E>D>B>A>G and C>F. Because the group value 'E' associated with group E represents the best estimated channel statistics in this example, the UE 404 can select 412 group E for beamforming communications from the base station 402 to the UE 404.

In general, the UE 404 may select the beam group that exhibits the highest group channel statistics. When two different beam groups exhibit substantially the same channel statistics, the UE 404 may select the beam group with the fewest number of beams. In still other examples, the UE 404 may still select a smaller group with less beams than a larger group when the smaller group exhibits channel statistics that are less than the channel statistics for the larger group, but within a threshold difference from the channel statistics for the larger group. For example, if group A in the example above exhibited the highest group value for channel statistics among all the groups, and group E had the second highest group value, the UE 404 may be configured to select group E when the difference between the group value for group A and the group value for group E is within a predefined threshold amount.

As noted above, group E only includes 2 combined beams instead of the maximum of 4 beams designated by the network. The UE 404 can accordingly select a precoder 414 for the 2 beams of the selected group. In the example above, the UE 404 can select a precoder utilizing just the 2 beams, since group E only includes 2 combined beams. For instance, in the precoder example described above, where $\tilde{w}_{r,l} = \Sigma_{i=0}^{L-1} b_{k_1^{(i)} k_2^{(i)}} \cdot p_{r,l,i}^{(WB)} \cdot p_{r,l,i}^{(SB)} \cdot c_{r,l,i}$, the UE 404 can determine the precoder by applying an amplitude (e.g., $p_{r,l,i}^{(WB)}$) of zero (0) for each unused beam. In some examples, the value 'L' can still be set at '$L_{MAX}$', which is 4 beams allowed in the present example. However, the UE 404 can indicate a wideband amplitude of zero for each of the unused beams, while the beams of the selected group E are indicated with their respectively measured amplitudes.

The UE 404 can subsequently send channel state feedback (CSF) 416 to the base station 402 based on a selected group. In some examples, the CSF transmission may indicate the selected precoder. In the example above where the selected group E includes just 2 combined beams while the network permits up to 4 combined beams, the CSF may include an indication that the unused beams have an amplitude that is equal to zero (0). For instance, continuing with the precoder example described above, where $\tilde{w}_{r,i} = \Sigma_{i=0}^{L-1} b_{k_1}{}^{(i)} b_{k_2}{}^{(i)} \cdot p_{r,l,i}{}^{(WB)} \cdot p_{r,l,i}{}^{(SB)} \cdot c_{r,l,i}$, the UE 404 can indicate the amplitude (e.g., $(p_{r,l,i}{}^{(WB)})$) for each unused beam as zero (0), while the 2 combined beams of group E are indicated with their respective amplitude measured by the UE 404.

In response to receiving the CSF including a selected precoder, the base station 402 may send a beamformed transmission 418 to the UE 404. This transmission may include utilizing a precoder selected by the UE 404. The selected precoder may include less beams than a maximum number permitted (e.g., allowed or designated by a BS, network, or some other operational parameter). For example, the base station 402 may send a beamformed transmission on the two DFT beams of group E, where the transmission is precoded according to the precoder selected by the UE 404 and received in the CSF. In this particular example, utilizing two beams results in using a number of beams less than an allowable limit of beams set by the BS 402. Utilizing less beams generally enables a number of technical advantages and/or benefits. By reducing the number of beams from the maximum permitted by the network, the UE 404 may significantly reduce the computations necessary to determine the precoder. Additionally, the UE 404 may significantly reduce the size of the transmission including the CSF by, for example, indicating unused beams with an amplitude of zero. Additional and/or different technical advantages and/or benefits may also be obtained by one or more of the features herein.

Figure 5:
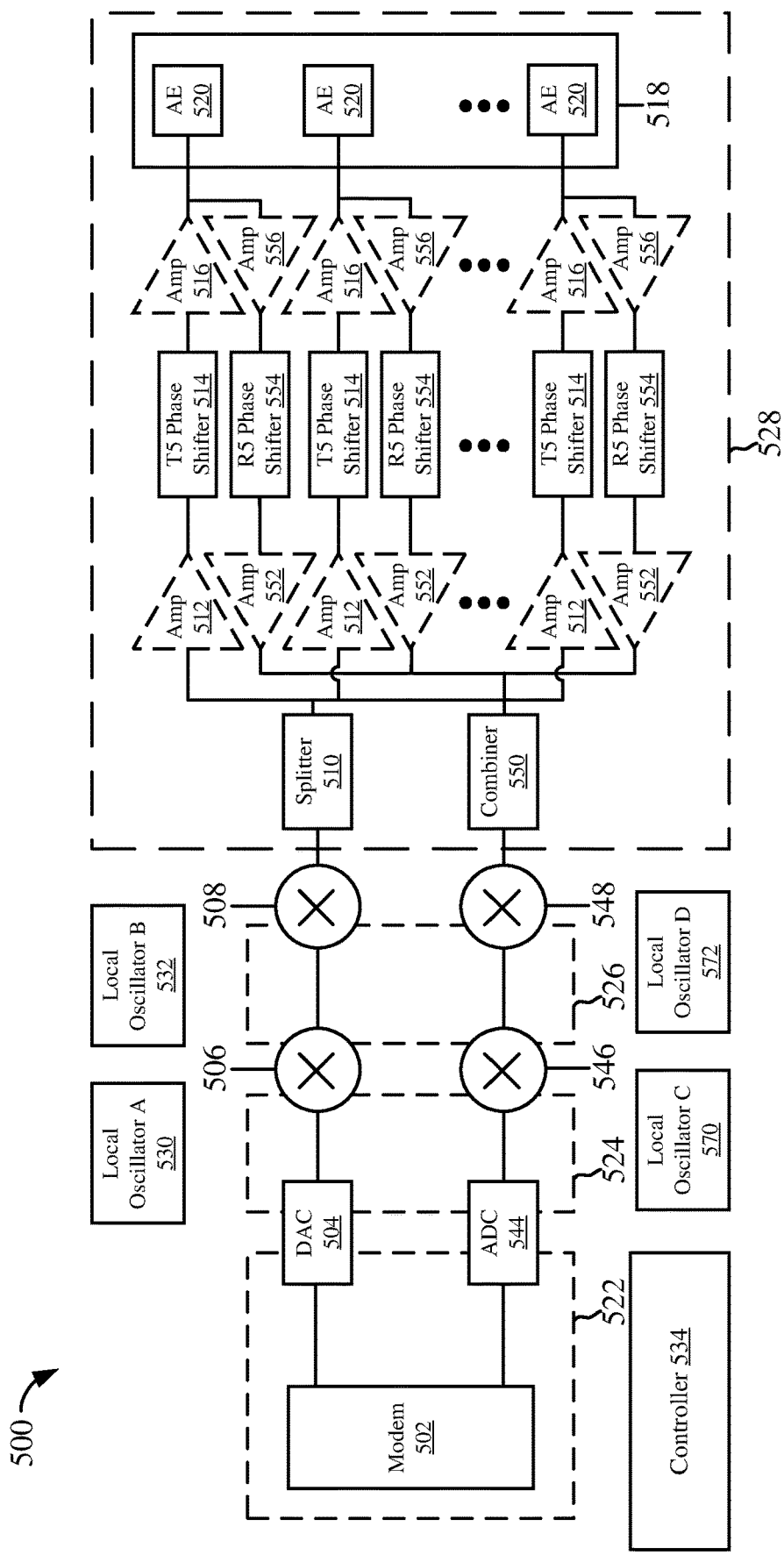
FIG. 5 is a block diagram illustrating an example of an architecture that supports transmission and/or reception of DFT based beams according to some embodiments.

Turning to FIG. 5, a block diagram is shown illustrating an example of an architecture that supports transmission and/or reception of DFT based beams. In some aspects, diagram 500 may be an example of a transmitting device (e.g., a base station or transmitter) and/or a receiving device (e.g., a UE or receiver) as described herein. Broadly, FIG. 5 is a diagram illustrating example hardware components of a wireless device in accordance with certain aspects of the disclosure. The illustrated components may include those that may be used for antenna element selection and/or for beamforming for transmission of wireless signals. There are numerous architectures for antenna element selection and implementing phase shifting, only one example of which is illustrated here. The architecture 500 includes a modem (modulator/demodulator) 502, a digital to analog converter (DAC) 504, a first mixer 506, a second mixer 508, and a splitter 510. The architecture 500 also includes a plurality of first amplifiers 512, a plurality of phase shifters 514, a plurality of second amplifiers 516, and an antenna array 518 that includes a plurality of antenna elements 520. Transmission lines or other waveguides, wires, traces, or the like are shown connecting the various components to illustrate how signals to be transmitted may travel between components.

For receiving wireless signals, the architecture 500 includes the modem (modulator/demodulator) 502, an analog to digital converter (ADC) 544, a third mixer 546, a second mixer 548, and a combiner 550. The architecture 500 also includes a plurality of second amplifiers 552, a plurality of phase shifters 554, a plurality of first amplifiers 556, and the antenna array 518. Reception lines or other waveguides, wires, traces, or the like are shown connecting the various components to illustrate how received signals may travel between components.

Boxes 522, 524, 526, and 528 indicate regions in the architecture 500 in which different types of signals travel or are processed. Specifically, box 522 indicates a region in which digital baseband signals travel or are processed, box 524 indicates a region in which analog baseband signals travel or are processed, box 526 indicates a region in which analog intermediate frequency (IF) signals travel or are processed, and box 528 indicates a region in which analog radio frequency (RF) signals travel or are processed. The architecture also includes a local oscillator A 530, a local oscillator B 532, and a controller 534.

Each of the antenna elements 520 may include one or more sub-elements (not shown) for radiating or receiving RF signals. For example, a single antenna element 520 may include a first sub-element cross-polarized with a second sub-element that can be used to independently transmit cross-polarized signals. The antenna elements 520 may include patch antennas or other types of antennas arranged in a linear, two dimensional, or other pattern. A spacing between antenna elements 520 may be such that signals with a desired wavelength transmitted separately by the antenna elements 520 may interact or interfere (e.g., to form a desired beam). For example, given an expected range of wavelengths or frequencies, the spacing may provide a quarter wavelength, half wavelength, or other fraction of a wavelength of spacing between neighboring antenna elements 520 to allow for interaction or interference of signals transmitted by the separate antenna elements 520 within that expected range.

The modem 502 processes and generates digital baseband signals and may also control operation of the DAC 504, first and second mixers 506, 508, splitter 510, first amplifiers 512, phase shifters 514, and/or the second amplifiers 516 to transmit signals via one or more or all of the antenna elements 520. The modem 502 may process signals and control operation in accordance with a communication standard such as a wireless standard discussed herein. The DAC 504 may convert digital baseband signals received from the modem 502 (and that are to be transmitted) into analog baseband signals. The first mixer 506 upconverts analog baseband signals to analog IF signals within an IF using a local oscillator A 530. For example, the first mixer 506 may mix the signals with an oscillating signal generated by the local oscillator A 530 to "move" the baseband analog signals to the IF. In some cases some processing or filtering (not shown) may take place at the IF. The second mixer 508 upconverts the analog IF signals to analog RF signals using the local oscillator B 532. Similarly to the first mixer, the second mixer 508 may mix the signals with an oscillating signal generated by the local oscillator B 532 to "move" the IF analog signals to the RF, or the frequency at which signals will be transmitted or received. The modem 502 and/or the controller 534 may adjust the frequency of local oscillator A 530 and/or the local oscillator B 532 so that a desired IF and/or RF frequency is produced and used to facilitate processing and transmission of a signal within a desired bandwidth.

In the illustrated architecture 500, signals upconverted by the second mixer 508 are split or duplicated into multiple signals by the splitter 510. The splitter 510 in architecture 500 splits the RF signal into a plurality of identical or nearly identical RF signals, as denoted by its presence in box 528. In other examples, the split may take place with any type of signal including with baseband digital, baseband analog, or IF analog signals. Each of these signals may correspond to an antenna element 520 and the signal travels through and is processed by amplifiers 512, 516, phase shifters 514, and/or other elements corresponding to the respective antenna element 520 to be provided to and transmitted by the corresponding antenna element 520 of the antenna array 518. In one example, the splitter 510 may be an active splitter that is connected to a power supply and provides some gain so that RF signals exiting the splitter 510 are at a power level equal to or greater than the signal entering the splitter 510. In another example, the splitter 510 is a passive splitter that is not connected to power supply and the RF signals exiting the splitter 510 may be at a power level lower than the RF signal entering the splitter 510.

After being split by the splitter 510, the resulting RF signals may enter an amplifier, such as a first amplifier 512, or a phase shifter 514 corresponding to an antenna element 520. The first and second amplifiers 512, 516 are illustrated with dashed lines because one or both of them might not be necessary in some implementations. In one implementation, both the first amplifier 512 and second amplifier 514 are present. In another, neither the first amplifier 512 nor the second amplifier 514 is present. In other implementations, one of the two amplifiers 512, 514 is present but not the other. By way of example, if the splitter 510 is an active splitter, the first amplifier 512 may not be used. By way of further example, if the phase shifter 514 is an active phase shifter that can provide a gain, the second amplifier 516 might not be used. The amplifiers 512, 516 may provide a desired level of positive or negative gain. A positive gain (positive dB) may be used to increase an amplitude of a signal for radiation by a specific antenna element 520. A negative gain (negative dB) may be used to decrease an amplitude and/or suppress radiation of the signal by a specific antenna element. Each of the amplifiers 512, 516 may be controlled independently (e.g., by the modem 502 or controller 534) to provide independent control of the gain for each antenna element 520. For example, the modem 502 and/or the controller 534 may have at least one control line (not shown) connected to each of the splitter 510, first amplifiers 512, phase shifters 514, and/or second amplifiers 516 which may be used to configure a gain to provide a desired amount of gain for each component and thus each antenna element 520.

The phase shifter 514 may provide a configurable phase shift or phase offset to a corresponding RF signal to be transmitted. The phase shifter 514 could be a passive phase shifter not directly connected to a power supply. Passive phase shifters might introduce some insertion loss. The second amplifier 516 could boost the signal to compensate for the insertion loss. The phase shifter 514 could be an active phase shifter connected to a power supply such that the active phase shifter provides some amount of gain or prevents insertion loss. The settings of each of the phase shifters 514 are independent meaning that each can be set to provide a desired amount of phase shift or the same amount of phase shift or some other configuration. The modem 502 and/or the controller 534 may have at least one control line connected to each of the phase shifters 514 and which may be used to configure the phase shifters 514 to provide a desired amounts of phase shift or phase offset between antenna elements 520.

In the illustrated architecture 500, RF signals received by the antenna elements 520 are provided to one or more of first amplifier 556 to boost the signal strength. The first amplifier 556 may be connected to the same antenna arrays 518, e.g., for TDD operations. The first amplifier 556 may be connected to different antenna arrays 518. The boosted RF signal is input into one or more of phase shifter 554 to provide a configurable phase shift or phase offset for the corresponding received RF signal. The phase shifter 554 may be an active phase shifter or a passive phase shifter. The settings of the phase shifters 554 are independent, meaning that each can be set to provide a desired amount of phase shift or the same amount of phase shift or some other configuration. The modem 502 and/or the controller 534 may have at least one control line connected to each of the phase shifters 554 and which may be used to configure the phase sifters 554 to provide a desired amount of phase shift or phase offset between antenna elements 520.

The outputs of the phase shifters 554 may be input to one or more second amplifiers 552 for signal amplification of the phase shifted received RF signals. The second amplifiers 552 may be individually configured to provide a configured amount of gain. The second amplifiers 552 may be individually configured to provide an amount of gain to ensure that the signal input to combiner 550 have the same magnitude. The amplifiers 552 and/or 556 are illustrated in dashed lines because they might not be necessary in some implementations. In one implementation, both the amplifier 552 and the amplifier 556 are present. In another, neither the amplifier 552 nor the amplifier 556 are present. In other implementations, one of the amplifiers 552, 556 is present but not the other.

In the illustrated architecture 500, signals output by the phase shifters 554 (via the amplifiers 552 when present) are combined in combiner 550. The combiner 550 in architecture 500 combines the RF signal into a signal, as denoted by its presence in box 528. The combiner 550 may be a passive combiner, e.g., not connected to a power source, which may result in some insertion loss. The combiner 550 may be an active combiner, e.g., connected to a power source, which may result in some signal gain. When combiner 550 is an active combiner, it may provide a different (e.g., configurable) amount of gain for each input signal so that the input signals have the same magnitude when they are combined. When combiner 550 is an active combiner, it may not need the second amplifier 552 because the active combiner may provide the signal amplification.

The output of the combiner 550 is input into mixers 548 and 546. Mixers 548 and 546 generally down convert the received RF signal using inputs from local oscillators 572 and 570, respectively, to create intermediate or baseband signals that carry the encoded and modulated information. The output of the mixers 548 and 546 are input into an analog-to-digital converter (ADC) 544 for conversion to digital signals. The digital signals output from ADC 544 are input to modem 502 for baseband processing, e.g., decoding, de-interleaving, etc.

The architecture 500 is given by way of example only to illustrate an architecture for transmitting and/or receiving signals. It will be understood that the architecture 500 and/or each portion of the architecture 500 may be repeated multiple times within an architecture to accommodate or provide an arbitrary number of RF chains, antenna elements, and/or antenna panels. Furthermore, numerous alternate architectures are possible and contemplated. For example, although only a single antenna array 518 is shown, two, three, or more antenna arrays may be included each with one or more of their own corresponding amplifiers, phase shifters, splitters, mixers, DACs, ADCs, and/or modems. For example, a single UE may include two, four or more antenna arrays for transmitting or receiving signals at different physical locations on the UE or in different directions. Furthermore, mixers, splitters, amplifiers, phase shifters and other components may be located in different signal type areas (e.g., different ones of the boxes 522, 524, 526, 528) in different implemented architectures. For example, a split of the signal to be transmitted into a plurality of signals may take place at the analog RF, analog IF, analog baseband, or digital baseband frequencies in different examples. Similarly, amplification, and/or phase shifts may also take place at different frequencies. For example, in some contemplated implementations, one or more of the splitter 510, amplifiers 512, 516, or phase shifters 514 may be located between the DAC 504 and the first mixer 506 or between the first mixer 506 and the second mixer 508. In one example, the functions of one or more of the components may be combined into one component. For example, the phase shifters 514 may perform amplification to include or replace the first and/or or second amplifiers 512, 516. By way of another example, a phase shift may be implemented by the second mixer 508 to obviate the need for a separate phase shifter 514. This technique is sometimes called local oscillator (LO) phase shifting. In one implementation of this configuration, there may be a plurality of IF to RF mixers (e.g., for each antenna element chain) within the second mixer 508 and the local oscillator B 532 would supply different local oscillator signals (with different phase offsets) to each IF to RF mixer.

The modem 502 and/or the controller 534 may control one or more of the other components 504-572 to select one or more antenna elements 520 and/or to form beams for transmission of one or more signals. For example, the antenna elements 520 may be individually selected or deselected for transmission of a signal (or signals) by controlling an amplitude of one or more corresponding amplifiers, such as the first amplifiers 512 and/or the second amplifiers 516. Beamforming includes generation of a beam using a plurality of signals on different antenna elements where one or more or all of the plurality signals are shifted in phase relative to each other. The formed beam may carry physical or higher layer reference signals or information. As each signal of the plurality of signals is radiated from a respective antenna element 520, the radiated signals interact, interfere (constructive and destructive interference), and amplify each other to form a resulting beam. The shape (such as the amplitude, width, and/or presence of side lobes) and the direction (such as an angle of the beam relative to a surface of the antenna array 518) can be dynamically controlled by modifying the phase shifts or phase offsets imparted by the phase shifters 514 and amplitudes imparted by the amplifiers 512, 516 of the plurality of signals relative to each other.

Controller components discussed herein may operate in a variety of operational scenarios. For example, the controller 534 may, when architecture 500 is configured as a receiving device, transmit a first beam measurement report to a first wireless device, the first beam measurement report (e.g., CSF) indicating a first set of beam measurements for a wireless channel between the first wireless device and the second wireless device. The controller 534 may receive from the first wireless device a cluster validity metric for at least one beam in the first beam measurement report. The controller 534 may transmit to the first wireless device a second beam measurement report based at least in part on the cluster validity metric, the second beam measurement report indicating a second set of beam measurements for the wireless channel, as discussed herein. The controller 534 may, when architecture 500 is configured as a transmitting device, receive a first beam measurement report from a second wireless device, the first beam measurement report indicating a first set of beam measurements for a wireless channel between the first wireless device and the second wireless device. The controller 534 may transmit to the second wireless device a cluster validity metric for at least one beam in the first beam measurement report. The controller 534 may receive from the second wireless device, in response to transmitting the cluster validity metric, a second beam measurement report indicating a second set of beam measurements for the wireless channel. The controller 534 may select a beam for transmitting to the second wireless device based at least in part on the first and second beam measurement reports, as discussed herein. The controller 534 may be located partially or fully within one or more other components of the architecture 500. For example, the controller 534 may be located within the modem 502 in at least one implementation.

Figure 6:
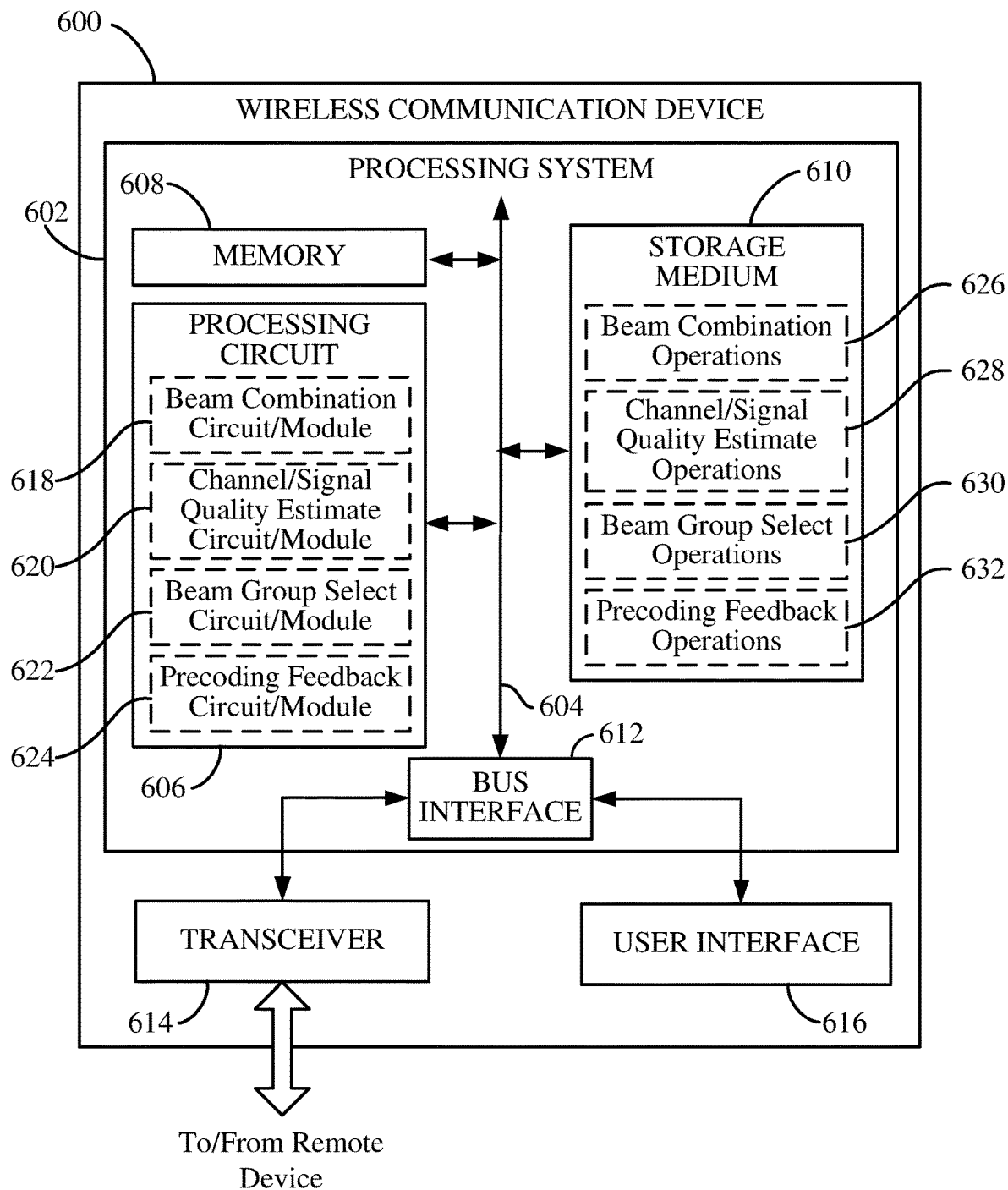
FIG. 6 is a block diagram illustrating various components of a wireless communication device employing a processing system according to at least one example of the present disclosure.

Turning now to FIG. 6, a block diagram is shown illustrating various components of a wireless communication device 600 employing a processing system 602 according to at least one example of the present disclosure. In some instances, the modem 502 and/or the controller 534 described above with reference to FIG. 5 may be located partially or fully within the processing system 602 (e.g., processing circuit 606, storage medium 610).

In the depicted example, the processing system 602 is implemented with a bus architecture, represented generally by the bus 604. The bus 604 may include any number of interconnecting buses and bridges depending on the specific application of the processing system 602 and the overall design constraints. The bus 604 communicatively couples together various circuits including one or more processors (represented generally by the processing circuit 606), a memory 608, and computer-readable media (represented generally by the storage medium 610). The bus 604 may also link various other circuits such as timing sources, peripherals, voltage regulators, and power management circuits, which are well known in the art, and therefore, will not be described any further. A bus interface 612 provides an interface between the bus 604 and a transceiver 614. The transceiver 614 provides a means for communicating with various other apparatus over a transmission medium. For example, the transceiver 614 may include an antenna array sized and shaped to facilitate beam-based communications (e.g., mmWave beam-based communications), and a receive chain to receive one or more wireless signals via the antenna array. The transceiver 614 may also include a transmit chain to transmit one or more wireless signals via the antenna array. In some instances, various components in FIG. 5 (e.g., in boxes 524, 526, 528, and/or local oscillators 530, 532, 570, 572) may be located partially or fully within the transceiver 614. Depending upon the nature of the apparatus, a user interface 616 (e.g., keypad, display, speaker, microphone, joystick) may also be provided.

The processing circuit 606 is responsible for managing the bus 604 and general processing, including the execution of programming stored on the computer-readable storage medium 610. The programming, when executed by the processing circuit 606, causes the processing system 602 to perform the various functions described below for any particular apparatus. The computer-readable storage medium 610 and the memory 608 may also be used for storing data that is manipulated by the processing circuit 606 when executing programming. As used herein, the term "programming" shall be construed broadly to include without limitation instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

The processing circuit 606 is arranged to obtain, process and/or send data, control data access and storage, issue commands, and control other desired operations. The processing circuit 606 may include circuitry adapted to implement desired programming provided by appropriate media, and/or circuitry adapted to perform one or more functions described in this disclosure. For example, the processing circuit 606 may be implemented as one or more processors, one or more controllers, and/or other structure configured to execute executable programming and/or execute specific functions. Examples of the processing circuit 606 may include a general purpose processor, a digital signal processor (DSP), an application specific integrated circuit (ASIC), a field programmable gate array (FPGA) and/or other programmable logic component, discrete gate or transistor logic, discrete hardware components, or any combination thereof designed to perform the functions described herein. A general purpose processor may include a microprocessor, as well as any conventional processor, controller, microcontroller, or state machine. The processing circuit 606 may also be implemented as a combination of computing components, such as a combination of a DSP and a microprocessor, a number of microprocessors, one or more microprocessors in conjunction with a DSP core, an ASIC and a microprocessor, or any other number of varying configurations. These examples of the processing circuit 606 are for illustration and other suitable configurations within the scope of the present disclosure are also contemplated.

The processing circuit 606 may be configured to determine a first beam group from a plurality of communication beams, where the first beam group includes a number of beams lower than a number of allowed beams based on channel conditions. The processing circuit 606 may also be configured to compare statistics associated with the first beam group to another beam group including a number of beams greater than the number of beams in the first beam group. The processing circuit 606 may further be configured to select a precoder based on the first beam group. In at least some examples, the processing circuit 606 may utilize a Type II codebook for selecting the precoder.

In some instances, the processing circuit 606 may include a beam combination circuit and/or module 618, a channel and/or signal quality estimate circuit and/or module 620, a beam group select circuit and/or module 622, and a precoding feedback circuit and/or module 624. The beam combination circuit/module 618 may generally include circuitry and/or programming (e.g., programming stored on the storage medium 610) adapted to determine a plurality of potential beam combinations including a first beam combination including a first group of beams equal to a maximum number of beams permitted by the network and at least a second beam combination including a second group of beams less than the maximum number permitted by the network. The channel/signal quality estimate circuit/module 620 may generally include circuitry and/or programming (e.g., programming stored on the storage medium 610) adapted to estimate channel statistics for each of the first group of beams and the second group of beams. The beam group select circuit/module 622 may generally include circuitry and/or programming (e.g., programming stored on the storage medium 610) adapted to select a beam combination group exhibiting sufficient channel statistics with the fewest number of combined beams. The precoding feedback circuit/module 624 may generally include circuitry and/or programming (e.g., programming stored on the storage medium 610) adapted to select a precoder and/or generate precoding feedback (e.g., a CSF) based on the selected beam combination group. As used herein, reference to circuitry and/or programming may be generally referred to as logic (e.g., logic gates and/or data structure logic).

The storage medium 610 may represent one or more computer-readable devices for storing programming, such as processor executable code or instructions (e.g., software, firmware), electronic data, databases, or other digital information. The storage medium 610 may also be used for storing data that is manipulated by the processing circuit 606 when executing programming. The storage medium 610 may be any available non-transitory media that can be accessed by a general purpose or special purpose processor, including portable or fixed storage devices, optical storage devices, and various other mediums capable of storing, containing and/or carrying programming By way of example and not limitation, the storage medium 610 may include a non-transitory computer-readable storage medium such as a magnetic storage device (e.g., hard disk, floppy disk, magnetic strip), an optical storage medium (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, a removable disk, and/or other mediums for storing programming, as well as any combination thereof.

The storage medium 610 may be coupled to the processing circuit 606 such that the processing circuit 606 can read information from, and write information to, the storage medium 610. That is, the storage medium 610 can be coupled to the processing circuit 606 so that the storage medium 610 is at least accessible by the processing circuit 606, including examples where the storage medium 610 is integral to the processing circuit 606 and/or examples where the storage medium 610 is separate from the processing circuit 606 (e.g., resident in the processing system 602, external to the processing system 602, distributed across multiple entities).

Programming stored by the storage medium 610, when executed by the processing circuit 606, can cause the processing circuit 606 to perform one or more of the various functions and/or process steps described herein. In at least some examples, the storage medium 610 may include beam combination operations 626, channel/signal quality operations 628, beam group select operations 630, and/or precoding feedback operations 632. The beam combination operation 626 are generally adapted to cause the processing circuit 606 to determine a plurality of potential beam combinations including a first beam combination including a first group of beams equal to a maximum number of beams permitted by the network and at least a second beam combination including a second group of beams less than the maximum number permitted by the network, as described herein. The channel/signal quality estimate operations 628 are generally adapted to cause the processing circuit 606 to estimate channel statistics for each of the first group of beams and the second group of beams, as described herein. The beam group select operations 630 are generally adapted to cause the processing circuit 606 to select a beam combination group exhibiting sufficient channel statistics with the fewest number of combined beams, as described herein. The precoding feedback operations 632 are generally adapted to cause the processing circuit 606 to select a precoder and/or generate precoding feedback (e.g., a CSF) based on the selected beam combination group. Selection of a precoder may include selection of the precoder from one or more precoder codebooks found in the storage medium 610.

Thus, according to one or more aspects of the present disclosure, the processing circuit 606 is adapted to perform (independently or in conjunction with the storage medium 610) any or all of the processes, functions, steps and/or routines for one or more of the receiving wireless communication devices described herein (e.g., UE 222, 224, 226, 228, 230, 232, 234, 236, 238, 240, 242, 404, scheduled entity 106, receiver 306, device 500). As used herein, the term "adapted" in relation to the processing circuit 606 may refer to the processing circuit 606 being one or more of configured, employed, implemented, and/or programmed (in conjunction with the storage medium 610) to perform a particular process, function, step and/or routine according to various features described herein.

Figure 7:
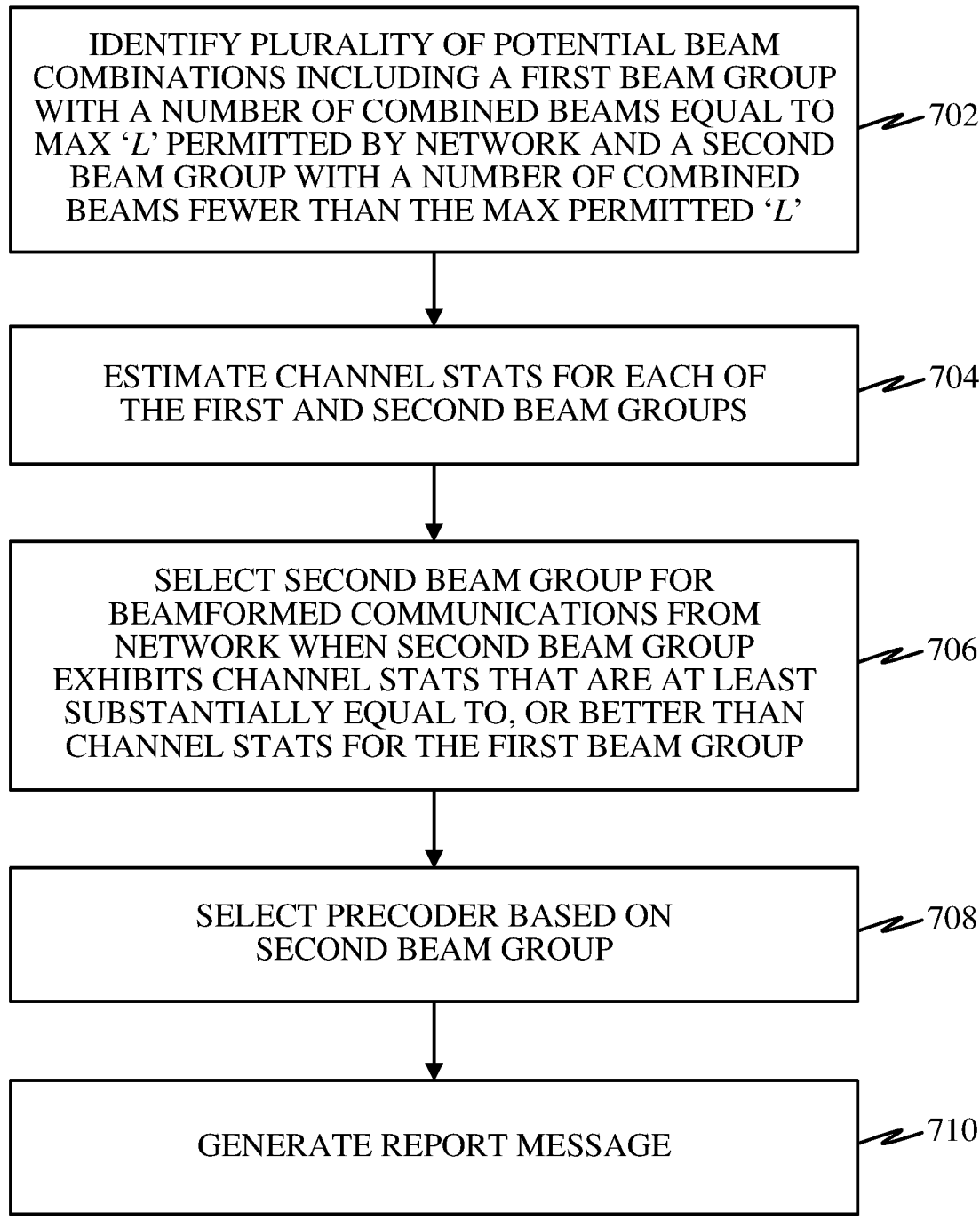
FIG. 7 is a flow diagram illustrating a wireless communication method (e.g., operational on or via a wireless communication device) according to at least one example.

FIG. 7 is a flow diagram illustrating at least one example of a method operational on a wireless communication device, such as the wireless communication device 600. Referring to FIGS. 6 and 7, a wireless communication device 600 can identify a plurality of potential beam combinations for receiving beamformed wireless communications at 702. For example, the processing system 602 may include logic (e.g. processing circuit 606, beam combination circuit/module 618, and/or beam combination operations 626) to identify a plurality of different combinations or groups of beams for receiving beamformed wireless communications. The plurality of potential beam combinations may include a first beam group that includes a number of beams equal to a maximum number of permitted beams Additionally, the plurality of potential beam combinations includes a second beam group that includes a number of beams less than the maximum number of permitted beams. For instance, if the maximum number of permitted beams is 4 beams, the first beam group may include a set of 4 beams over which the wireless communication device 600 can receive wireless communications. In the same scenario, the second beam group may include a set of 2 beams or 3 beams over which the wireless communication device 600 can receive wireless communications.

Figure 8:
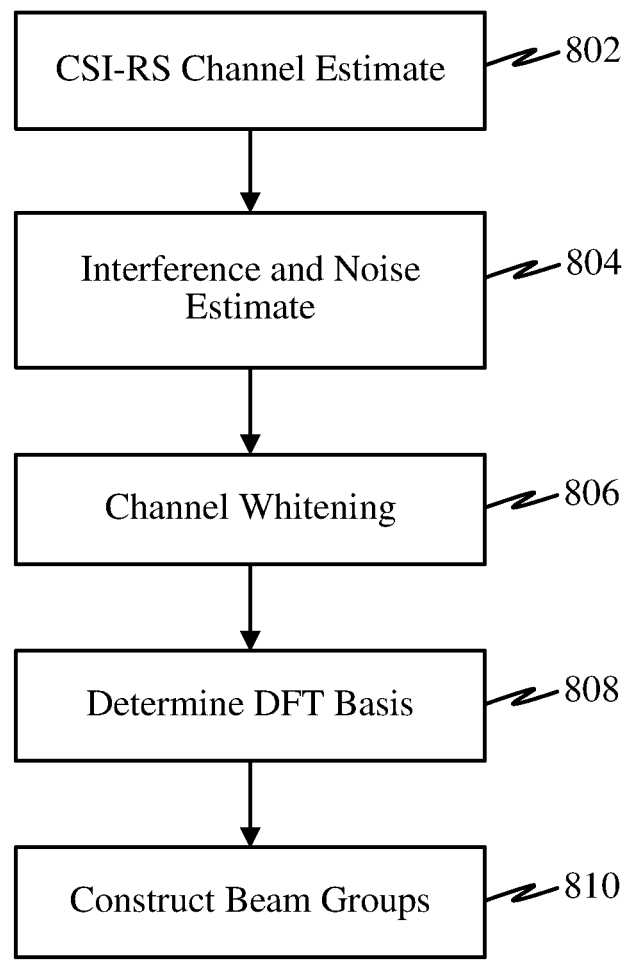
FIG. 8 is a flow diagram illustrating at least one example of an algorithm that may be implemented by a processing system (or wireless communication device) to implement a step in FIG. 7.

FIG. 8 is a flow diagram illustrating at least one example of an algorithm that may be implemented by the processing system 602 to implement step 702. Initially, the channel is estimated for each configured port based on a CSI reference signal (e.g., CSI-RS) at operation 802. At operation 804, the noise and interference is estimated. At operation 806, the channel may be whitened by removing the effects of the estimated noise and interference.

At operation 808, the DFT basis is determined. The DFT basis may be determined by pairwise projecting the whitened channel into each DFT beam to determine an energy metric for each DFT beam. As noted herein, there may be anywhere from 4 to 256 DFT beams. To determine the DFT basis, the energy metric can be determined for each pairwise projection of the channel, from which the dominant DFT beam may be identified. In this example, the dominant DFT beam may be the DFT beam with the strongest determined energy metric.

At operation 810, beam groups are constructed based on the dominant DFT beam or based on a plurality of strongest DFT beams, where each beam group includes a number of beams that the codebook allows to be combined. As noted herein, the codebook may specify which beams can be combined together. For example, the codebook may specify that beams must be a predefined number of indexes apart from each other (e.g., 2 indexes apart, 4 indexes apart, etc.). At least one beam group includes a number of beams equal to the maximum permitted by the network, and at least one beam group includes a number of beams less than the maximum permitted by the network.

Referring back to FIG. 7, the wireless communication device 600 may determine various channel statistics. In some implementations, the statistics may be group-based averages while in other implementation, determined statistics may include ranges, median/mean selections, discarding some individual beams, augmenting a beam group, etc. In one particular example, the wireless communication device 600 can estimate average channel statistics for each of the plurality of potential beam combinations, including for the first beam group and the second beam group at 704. For example, the processing system 602 may include logic (e.g. processing circuit 606, channel/signal quality estimate circuit/module 620, and/or channel/signal quality estimate operations 628) to estimate the channel statistics for each beam in each potential beam combination, and to calculate an average for each potential beam combination. According to various examples, the channel statistics may include channel correlation, covariance, cross correlation, and/or other channel state information for each beam.

At 706, the wireless communication device 600 may select a beam group with less beams than the maximum permitted, when the selected beam group exhibits channel statistics that are at least substantially equal to, or greater than the channel statistics for the beam group with the maximum permitted number of beams. For example, the processing system 602 may include logic (e.g. processing circuit 606, beam group select circuit/module 622, and/or beam group select operations 630) to select the second beam group for communications with the network when the second beam group exhibits at least substantially equal or higher channel statistics compared to the first beam group. In some examples, the processing system 602 may further include logic (e.g. processing circuit 606, beam group select circuit/module 622, and/or beam group select operations 630) to select the second beam group when the channel statistics for the second beam group are less than the channel statistics for the first beam group, but are still within a predefined threshold less than the channel statistics for the first beam group.

At 708, the wireless communication device 600 may select a precoder based at least in part on the selected beam group. For example, the processing system 602 may include logic (e.g. processing circuit 606, precoding feedback circuit/module 624, and/or precoding feedback operations 632) to select a precoder based at least in part on the selected second beam group. In this implementation, selection of the precoder will be relatively less complex when based on the second beam group compared to the first beam group as a result of the second beam group utilizing less beams than the first beam group. In other words, the processing system 602 can include logic (e.g. processing circuit 606, precoding feedback circuit/module 624, and/or precoding feedback operations 632) to reduce the computation complexity for selecting a precoder by setting a limit on the number of beams, where the limitation on the number of beams was derived based on the estimated channel conditions, as described above with reference to steps 702 and 704.

According to at least one example, the codebook may assume the following precoder structure:

$$W = \begin{bmatrix} \tilde{w}_{0,0} \\ \tilde{w}_{1,0} \end{bmatrix} = W_1 W_2, \text{ where } W \text{ is normalized to } 1. \quad \text{Rank 1}$$

-continued $$W = \begin{bmatrix} \tilde{w}_{0,0} & \tilde{w}_{0,1} \\ \tilde{w}_{1,0} & \tilde{w}_{1,1} \end{bmatrix} = W_1 W_2, \quad \text{Rank 2}$$

where columns of $W$ are normazlied to $\frac{1}{\sqrt{2}}$.

Given $\tilde{w}_{r,l} = \sum_{i=0}^{L-1} b_{k_1^{(i)}, k_2^{(i)}} \cdot p_{r,l,i}^{(WB)} \cdot p_{r,l,i}^{(SB)} \cdot c_{r,l,i}$, Where $b_{k_1,k_2}$ is an oversampled two-dimensional discrete Fourier transform (DFT) beam, r=0, 1 (polarization), l=0, 1 (layer), $p_{r,l,i}^{(WB)}$ is a wideband (WB) beam amplitude scaling factor (3 bits), $p_{r,l,i}^{(SB)}$ is a subband (SB) beam amplitude scaling factor (1 bit), and $c_{r,l,i}$ is a beam combining coefficient (2 or 3 bits configurable). The value for can be the maximum number of allowed beams (i.e., '$L_{MAX}$'), and may be predefined (e.g., by a network or according to desired operations).

Given the above, the processing system 602 may include logic (e.g. processing circuit 606, precoding feedback circuit/module 624, and/or precoding feedback operations 632) to calculate the precoder based on the selected second beam group by applying an amplitude ($p_{r,l,i}^{(WB)}$) of zero (0) for each unused beam, for the predefined number '$L_{MAX}$'. For example, if the second beam group includes 3 beams and the maximum number of allowed beams defined by '$L_{MAX}$' were 4 beams, the wireless communication device 600 may select the precoder by indicating the 3 beams of the second beam group with their respectively measured amplitudes and other respective information for the precoder above, while indicating a $4^{th}$ beam that is not included in the selected second beam group as exhibiting an amplitude ($p_{r,l,i}^{(WB)}$) of zero (0). Once the amplitude for the unused beam is set to zero (0), any additional information in the precoder for that beam is not required.

At 710, the wireless communication device 600 may generate a report message. For example, the processing system 602 may include logic (e.g. processing circuit 606, precoding feedback circuit/module 624, and/or precoding feedback operations 632) to generate a report message to be transmitted via the transceiver 614. In at least one implementation, the report message may be a channel quality information (CQI) message. The report message may include an indication of the selected precoder and/or estimated channel quality feedback. In at least one example, the estimated channel quality feedback may indicate an amplitude of zero for at least one DFT beam that was included in the first beam group, but was not included in the selected second beam group. For example, if the first beam group included DFT beams A, B, C, and D, and the second beam group included DFT beams A and D, the estimated channel quality feedback may indicate the wideband amplitude for beam B and/or beam C artificially as a zero amplitude.

After a report message is generated, the wireless communication device 600 may transmit the report message. For example, the processing system 602 may include logic to transmit the report message via the transceiver 614. In at least some examples, the wireless device 600 may transmit a reduced number of bits as a result of selecting a beam group with less beams than the maximum permitted. For instance, by selecting the second beam group with less beams compared to the first beam group, the report message may include less bits for transmission compared to the case where the first beam group had been selected. As noted above, in some instances the transmitted report message may include estimated channel quality feedback indicating an amplitude of zero for at least one DFT beam that was measured/estimated with an amplitude greater than zero, but which was not included in the selected second beam group.

Figure 9:
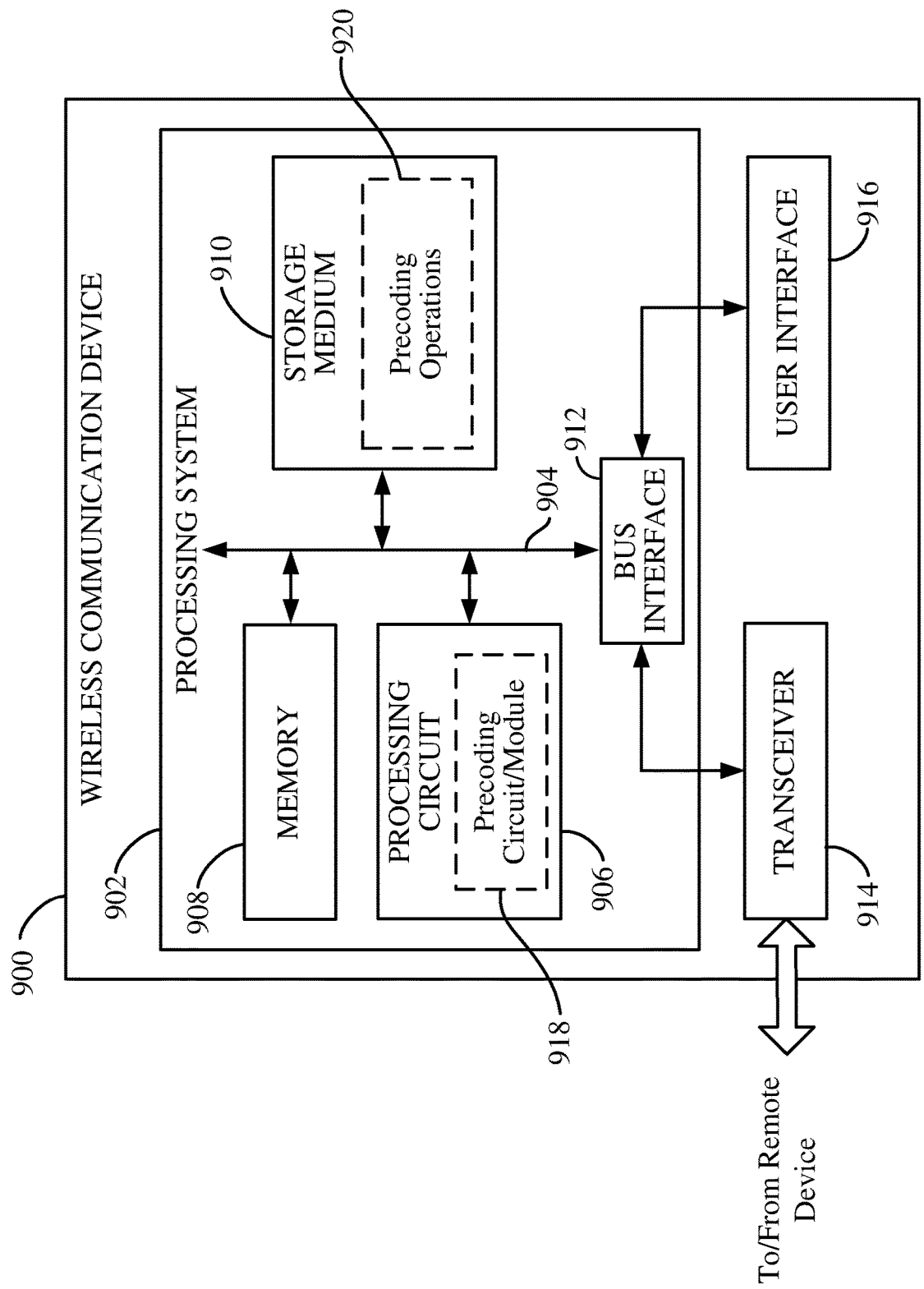
FIG. 9 is a block diagram illustrating various components of a wireless communication device employing a processing system according to at least one example of the present disclosure.

FIG. 9 is a block diagram illustrating select components of a wireless communication device 900 employing a processing system 902 according to at least one example of the present disclosure. In some instances, the modem 502 and/or the controller 534 described above with reference to FIG. 5 may be located partially or fully within the processing system 902 (e.g., processing circuit 906, storage medium 910).

Similar to the processing system 602 in FIG. 6, the processing system 902 may be implemented with a bus architecture, represented generally by the bus 904. The bus 904 may include any number of interconnecting buses and bridges depending on the specific application of the processing system 902 and the overall design constraints. The bus 904 communicatively couples together various circuits including one or more processors (represented generally by the processing circuit 906), a memory 908, and computer-readable media (represented generally by the storage medium 910). The bus 904 may also link various other circuits such as timing sources, peripherals, voltage regulators, and power management circuits, which are well known in the art, and therefore, will not be described any further. A bus interface 912 provides an interface between the bus 904 and a transceiver 914. The transceiver 914 provides a means for communicating with various other apparatus over a transmission medium. In some instances, various components in FIG. 5 (e.g., in boxes 524, 526, 528, and/or local oscillators 530, 532, 570, 572) may be located partially or fully within the transceiver 914. Depending upon the nature of the apparatus, a user interface 916 (e.g., keypad, display, speaker, microphone, joystick) may also be provided.

The processing circuit 906 is responsible for managing the bus 904 and general processing, including the execution of programming stored on the computer-readable storage medium 910. The programming, when executed by the processing circuit 906, causes the processing system 902 to perform the various functions described below for any particular apparatus. The computer-readable storage medium 910 and the memory 908 may also be used for storing data that is manipulated by the processing circuit 906 when executing programming.

The processing circuit 906 is arranged to obtain, process and/or send data, control data access and storage, issue commands, and control other desired operations. The processing circuit 906 may include circuitry adapted to implement desired programming provided by appropriate media in at least one example, and/or circuitry adapted to perform one or more functions described in this disclosure. The processing circuit 906 may be implemented and/or configured according to any of the examples of the processing circuit 606 described above.

In some instances, the processing circuit 906 may include a precoding circuit and/or module 918. The precoding circuit/module 920 may generally include circuitry and/or programming (e.g., programming stored on the storage medium 910) adapted to receive a message indicating a precoder for use in sending beamformed transmissions as described herein, to precode a message with the indicated precoder, and to send the precoded message as a beamformed transmission. As noted previously, reference to circuitry and/or programming may be generally referred to as logic (e.g., logic gates and/or data structure logic).

The storage medium 910 may represent one or more computer-readable devices for storing programming, such as processor executable code or instructions (e.g., software, firmware), electronic data, databases, or other digital information. The storage medium 910 may be configured and/or implemented in a manner similar to the storage medium 710 described above.

Programming stored by the storage medium 910, when executed by the processing circuit 906, can cause the processing circuit 906 to perform one or more of the various functions and/or process steps described herein. In at least some examples, the storage medium 910 may include precoding operations 920 adapted to cause the processing circuit 906 to receive a message indicating a precoder for use in sending beamformed transmissions as described herein, to precode a message with the indicated precoder, and to send the precoded message as a beamformed transmission, as described herein. Thus, according to one or more aspects of the present disclosure, the processing circuit 906 is adapted to perform (independently or in conjunction with the storage medium 910) any or all of the processes, functions, steps and/or routines for one or more of the wireless communication devices described herein (e.g., base station 210, 212, 214, 218, 402, UE 238, quadcopter 220, scheduling entity 108, 300, transmitter 302, device 500). As used herein, the term "adapted" in relation to the processing circuit 906 may refer to the processing circuit 906 being one or more of configured, employed, implemented, and/or programmed (in conjunction with the storage medium 910) to perform a particular process, function, step and/or routine according to various features described herein.

Figure 10:
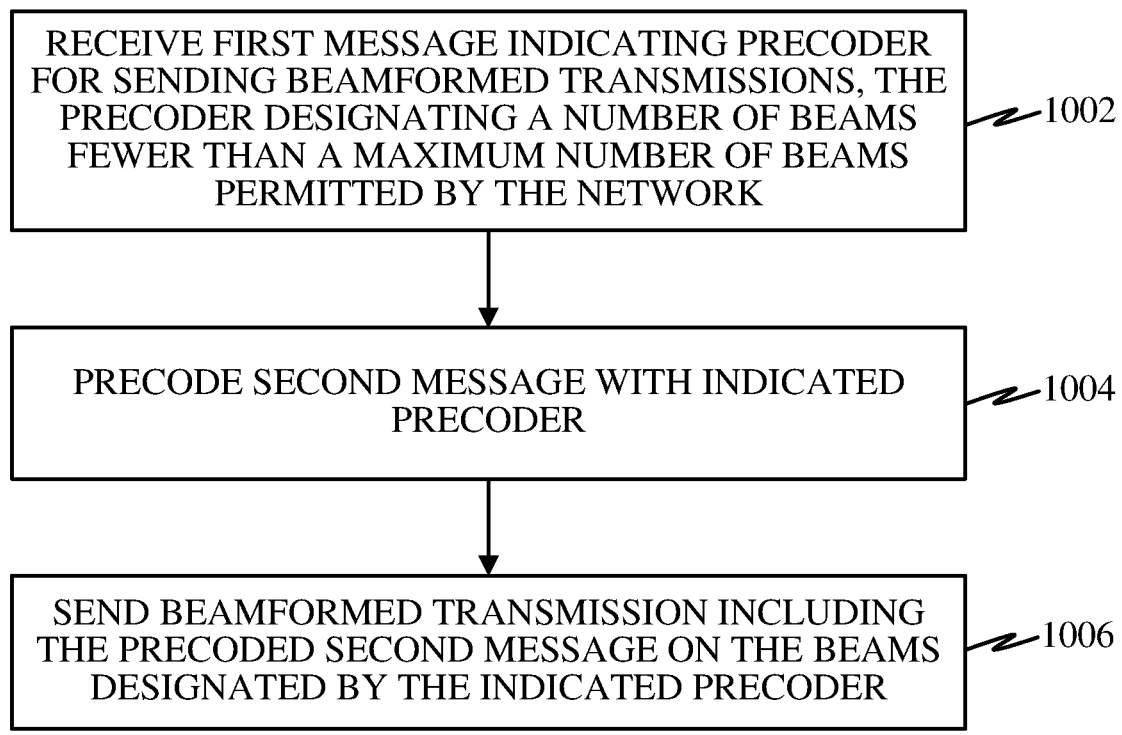
FIG. 10 is a flow diagram illustrating a method operational on or via a wireless communication device according to at least one example.

FIG. 10 is a flow diagram illustrating at least one example of a method operational on a wireless communication device, such as the wireless communication device 900. Referring to FIGS. 9 and 10, a wireless communication device 900 can receive a first message indicating a precoder for utilization in sending beamformed transmissions, where the precoder designates a number of beams less than a maximum number of beams permitted by the wireless network 1002. For example, the processing system 902 may include logic (e.g. processing circuit 906, precoding circuit/module 918, and/or precoding operations 920) to receive the first message. In at least some implementations, the first message may indicate at least one beam with an amplitude of zero.

At 1004, the wireless communication device 900 may precode a second message with the indicated precoder. For example, the processing system 902 may include logic (e.g. processing circuit 906, precoding circuit/module 918, and/or precoding operations 920) to precode the second message utilizing the indicated precoder. The indicated precoder may be obtained from a codebook stored in the storage medium 910 of the processing system 902.

At 1006, the wireless communication device 900 may send a beamformed transmission including the precoded second message on the beams designated by the indicated precoder. For example, the processing system 902 may include logic (e.g. processing circuit 906, precoding circuit/module 918, and/or precoding operations 920) to send a beamformed transmission via the transceiver 914, where the beamformed transmission includes the precoded second message, and where the beamformed transmission is sent on the beams associated with the indicated precoder. As a result, the wireless communication device 900 can send beamformed transmissions on a number of beams less than the maximum number of beams permitted by the network.

Several aspects of a wireless communication network have been presented with reference to an exemplary implementation. As those skilled in the art will readily appreciate, various aspects described throughout this disclosure may be extended to other telecommunication systems, network architectures and communication standards.

By way of example, various aspects may be implemented within other systems defined by 3GPP or combinations of such systems. These systems may include candidates such as 5G New Radio (NR), Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

While the above discussed aspects, arrangements, and embodiments are discussed with specific details and particularity, one or more of the components, steps, features and/or functions illustrated in FIGS. 1, 2, 3, 4, 5, 6, 7, 8, 9, and/or 10 may be rearranged and/or combined into a single component, step, feature or function or embodied in several components, steps, or functions. Additional elements, components, steps, and/or functions may also be added or not utilized without departing from the novel features of the present disclosure. The apparatus, devices and/or components illustrated in FIGS. 1, 2, 3, 5, 6, and/or 9 may be configured to perform or employ one or more of the methods, features, parameters, and/or steps described herein with reference to FIGS. 4, 7, 8, and/or 10. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The various features associate with the examples described herein and shown in the accompanying drawings can be implemented in different examples and implementations without departing from the scope of the present disclosure. Therefore, although certain specific constructions and arrangements have been described and shown in the accompanying drawings, such embodiments are merely illustrative and not restrictive of the scope of the disclosure, since various other additions and modifications to, and deletions from, the described embodiments will be apparent to one of ordinary skill in the art. Thus, the scope of the disclosure is only determined by the literal language, and legal equivalents, of the claims which follow.

What is claimed is:

1. A wireless communication device, comprising:
a transceiver;
a memory; and
a processing circuit communicatively coupled to the transceiver and the memory, the processing circuit configured to:
identify a first beam group with a number of beams equal to a maximum number of allowed beams, and a second beam group with a number of beams less than the maximum number of allowed beams;
estimate channel statistics for each of the first beam group and the second beam group; and
select the second beam group for wireless communications when the second beam group exhibits channel statistics that are at least substantially equal or greater than channel statistics for the first beam group.

2. The wireless communication device of claim 1, wherein the processing circuit is further configured to:
select a precoder based at least in part on the second beam group with the number of beams less than the maximum number of allowed beams;
generate a report message indicating the selected precoder; and
transmit the report message via the transceiver.

3. The wireless communication device of claim 1, wherein the processing circuit is further configured to:
select a precoder from a type II codebook based on the beams associated with the second beam group.

4. The wireless communication device of claim 1, wherein the processing circuit is further configured to:
generate a report message indicating an amplitude of zero for at least one beam.

5. The wireless communication device of claim 4, wherein the at least one beam is at least one of
included in the first beam group and not included in the selected second beam group, or estimated to have a non-zero amplitude.

6. The wireless communication device of claim 1, wherein the processing circuit is further configured to:
select the second beam group for wireless communications when the second beam group exhibits channel statistics that are within a threshold amount less than the channel statistics for the first beam group.

7. The wireless communication device of claim 1, wherein the processing circuit configured to estimate channel statistics for each of the first beam group and the second beam group comprises the processing circuit configured to:
estimate channel statistics including at least one of channel correlation, covariance, or cross correlation.

8. A method operational on a wireless communication device, comprising:
identifying a first beam group with a number of beams equal to a maximum number of allowed beams, and a second beam group with a number of beams less than the maximum number of allowed beams;
estimating channel statistics for each of the first beam group and the second beam group; and
selecting the second beam group for wireless communications when the second beam group exhibits channel statistics that are at least substantially equal or greater than channel statistics for the first beam group.

9. The method of claim 8, further comprising:
selecting a precoder based at least in part on the second beam group;
generating a report message indicating the selected precoder; and
transmitting the report message.

10. The method of claim 8, further comprising:
selecting a precoder from a type II codebook based on the beams associated with the second beam group.

11. The method of claim 8, further comprising:
generating a report message indicating an amplitude of zero for at least one beam.

12. The method of claim 11, wherein generating the report message indicating an amplitude of zero for at least one beam comprises at least one of:
generating the report message indicating an amplitude of zero for the at least one beam, wherein the at least one beam is included in the first beam group, but is not included in the selected second beam group, or
generating the report message indicating an amplitude of zero for the at least one beam, wherein the at least one beam is estimated to have a non-zero amplitude.

13. The method of claim 8, wherein estimating channel statistics for each of the first beam group and the second beam group comprises:
estimating channel statistics including at least one of channel correlation, covariance, or cross correlation.

14. The method of claim 8, wherein further comprising:
selecting the second beam group for wireless communications when the second beam group exhibits channel statistics that are within a threshold amount less than the channel statistics for the first beam group.

15. A wireless communication device, comprising:
means for identifying a first beam group with a number of beams equal to a maximum number of allowed beams, and a second beam group with a number of beams less than the maximum number of allowed beams;
means for estimating channel statistics for each of the first beam group and the second beam group; and
means for selecting the second beam group for wireless communications when the second beam group exhibits channel statistics that are at least substantially equal or greater than channel statistics for the first beam group.

16. The wireless communication device of claim 15, further comprising:
means for selecting a precoder based at least in part on the second beam group with the number of beams less than the maximum number of allowed beams;
means for generating a report message indicating the selected precoder; and
means for transmitting the report message.

17. The wireless communication device of claim 15, further comprising:
means for selecting a precoder from a type II codebook based on the beams associated with the second beam group.

18. The wireless communication device of claim 15, further comprising:
    means for generating a report message indicating an amplitude of zero for at least one beam.

19. The wireless communication device of claim 18, wherein generating the report message indicating an amplitude of zero for at least one beam comprises at least one of:
    generating the report message indicating an amplitude of zero for the at least one beam, wherein the at least one beam is included in the first beam group, but is not included in the selected second beam group, or
    generating the report message indicating an amplitude of zero for the at least one beam, wherein the at least one beam is estimated to have a non-zero amplitude.

20. The wireless communication device of claim 18, wherein estimating channel statistics for each of the first beam group and the second beam group comprises:
    estimating channel statistics including at least one of channel correlation, covariance, or cross correlation.

21. A non-transitory processor-readable storage medium storing processor-executable programming for causing a processing circuit to:
    identify a first beam group with a number of beams equal to a maximum number of allowed beams, and a second beam group with a number of beams less than the maximum number of allowed beams;
    estimate channel statistics for each of the first beam group and the second beam group; and
    select the second beam group for wireless communications when the second beam group exhibits channel statistics that are at least substantially equal or greater than channel statistics for the first beam group.

22. The processor-readable storage medium of claim 21, further comprising processor-executable programming for causing a processing circuit to:
    select a precoder based at least in part on the second beam group with the number of beams less than the maximum number of allowed beams;
    generate a report message indicating the selected precoder; and
    transmit the report message.

23. The processor-readable storage medium of claim 21, further comprising processor-executable programming for causing a processing circuit to:
    select a precoder from a type II codebook based on the beams associated with the second beam group.

24. The processor-readable storage medium of claim 21, further comprising processor-executable programming for causing a processing circuit to:
    generate a report message indicating an amplitude of zero for at least one beam.

25. The processor-readable storage medium of claim 24, wherein the at least one beam is at least one of
    included in the first beam group and not included in the selected second beam group, or estimated to have a non-zero amplitude.

26. The processor-readable storage medium of claim 24, wherein the processor-executable programming for causing a processing circuit to estimate channel statistics for each of the first beam group and the second beam group comprises processor-executable programming for causing a processing circuit to:
    estimate channel statistics including at least one of channel correlation, covariance, or cross correlation.

27. A wireless communication device, comprising:
    a transceiver;
    a memory; and
    a processing circuit communicatively coupled to the transceiver and the memory, the processing circuit configured to:
        receive a first message on a wireless network via the transceiver, the first message indicating a precoder for utilization in sending beamformed transmissions, wherein the precoder designates a number of beams less than a maximum number of beams permitted by the wireless network;
        precode a second message with the indicated precoder; and
        send via the transceiver a beamformed transmission including the precoded second message on the beams designated by the indicated precoder.

28. The wireless communication device of claim 27, wherein the received first message indicates at least one beam with an amplitude of zero.

29. A method operational on a wireless communication device, comprising:
    receiving a first message on a wireless network, the message indicating a precoder for utilization in sending beamformed transmissions, wherein the precoder designates a number of beams less than a maximum number of beams permitted by the wireless network;
    precoding a second message with the indicated precoder; and
    sending a transmission including the precoded second message on the beams designated by the indicated precoder.

30. The method of claim 29, wherein the received first message indicates at least one beam with an amplitude of zero.

31. A wireless communication device, comprising:
    means for receiving a first message on a wireless network, the message indicating a precoder for utilization in sending beamformed transmissions, wherein the precoder designates a number of beams less than a maximum number of beams permitted by the wireless network;
    means for precoding a second message with the indicated precoder; and
    means for sending a transmission including the precoded second message on the beams designated by the precoder.

32. The wireless communication device of claim 31, wherein the received first message indicates at least one beam with an amplitude of zero.

33. A non-transitory processor-readable storage medium storing processor-executable programming for causing a processing circuit to:
    receive a first message on a wireless network, the message indicating a precoder for utilization in sending beamformed transmissions, wherein the precoder designates a number of beams less than a maximum number of beams permitted by the wireless network;
    precode a second message with the indicated precoder; and
    send a beamformed transmission including the precoded second message on the beams designated by the indicated precoder.

34. The non-transitory processor-readable storage medium storing processor-executable programming for causing a processing circuit to of claim 33, wherein the received first message indicates at least one beam as including an amplitude of zero.

35. A wireless communication device, comprising:
    a transceiver;

a storage medium including at least one precoder codebook; and a processor communicatively coupled to the transceiver and the storage medium, the processor including a precoding feedback circuit configured to:

select a precoder from the at least one precoder codebook utilizing reduced computation complexity, wherein the reduction in computation complexity is a result of selecting a number of beams to be utilized for receiving beamformed transmissions that are less than a maximum number of permitted beams for combination in receiving beamformed transmissions, wherein the selected number of beams is derived based on estimated channel conditions indicating the selected number of beams provides at least substantially equal or higher channel statistics compared to the maximum number of permitted beams; and transmit a report message via the transceiver, wherein the report message indicates the selected precoder.

36. A wireless communication device, comprising:

a transceiver;

a memory; and a processing circuit communicatively coupled to the transceiver and the memory, the processing circuit configured to:

estimate channel statistics for a first beam combination including a number of combined beams equal to a maximum allowed number of combined beams;

estimate channel statistics for a second beam combination including a number of combined beams less than the maximum allowed number of combined beams; and select the second beam combination for communications with a network when the estimated channel statistics for the second beam combination are equal to or higher than the estimated channel statistics for the first beam combination.

37. A wireless communication device, comprising:

a transceiver;

a memory; and a processing circuit communicatively coupled to the transceiver and the memory, the processing circuit configured to:

generate a report message indicating estimated channel statistics for a plurality of digital beams, wherein the report message indicates an amplitude of zero for at least one digital beam that was estimated to have a non-zero amplitude; and transmit the report message via the transceiver.

38. A wireless communication device comprising:

an antenna array sized and shaped for millimeter wave (mmWave) beam-based communications, the antenna array comprising a plurality of spaced-apart antenna elements;

a receive chain configured to receive one or more wireless signals, via the antenna array, comprising a plurality of communication beams from another wireless communication device;

a processing circuit configured to determine a first beam group from the plurality of communication beams, the first beam group comprising a number of beams lower than a number of allowed beams based on channel conditions; and a transmit chain configured to transmit one or more wireless signals, via the antenna array, employing beams of the first beam group, wherein the processing circuit is further configured to compare statistics associated with the first beam group relative to another beam group comprising a number of beams greater than the number of beams in the first beam group.

39. The device of claim 38, wherein the processing circuit is further configured to select a precoder based at least in part on the first beam group and the transmit chain is configured to transmit, via the antenna array, a report message indicating the selected precoder.

40. The device of claim 38, wherein the processing circuit utilizes a Type II codebook for selecting a precoder based on beams of the first beam group.

* * * * *